(12) United States Patent
Galli et al.

(10) Patent No.: US 6,538,451 B1
(45) Date of Patent: Mar. 25, 2003

(54) SINGLE ENDED MEASUREMENT METHOD AND SYSTEM FOR DETERMINING SUBSCRIBER LOOP MAKE UP

(75) Inventors: Stefano Galli, Morristown, NJ (US); David L. Waring, Randolph, NJ (US)

(73) Assignee: Telcordia Technologies, Inc., Morristown, NJ (US)

( * ) Notice: Subject to any disclaimer, the term of this patent is extended or adjusted under 35 U.S.C. 154(b) by 161 days.

(21) Appl. No.: 09/587,459

(22) Filed: Jun. 5, 2000

Related U.S. Application Data

(60) Provisional application No. 60/141,121, filed on Jun. 25, 1999, and provisional application No. 60/157,094, filed on Sep. 30, 1999.

(51) Int. Cl.$^7$ .................. G01R 31/11; G01R 31/08; H04M 3/30

(52) U.S. Cl. ............ 324/533; 324/534; 324/535; 379/22.04; 379/27.03

(58) Field of Search ................... 324/533, 534, 324/535, 532, 642, 612, 603, 520; 379/26.01, 27.01, 22.04, 27.03; 703/3, 2, 4

(56) References Cited

U.S. PATENT DOCUMENTS

| | | | |
|---|---|---|---|
| 3,634,755 A | 1/1972 | Nicolson et al. ........... 324/57 R |
| 3,903,477 A | 9/1975 | Cronson et al. ......... 324/58.5 A |
| 4,446,341 A | 5/1984 | Rubin .................. 179/175.2 R |
| 4,459,437 A | 7/1984 | Gabry et al. ........... 179/175.3 F |
| 4,550,223 A | 10/1985 | Poitevin ................ 179/175.3 F |
| 4,620,069 A | 10/1986 | Godwin et al. ........ 179/175.3 R |
| 4,710,949 A | 12/1987 | Ahuja .......................... 379/26 |
| 4,970,466 A | 11/1990 | Bolles et al. ................. 324/533 |
| 5,083,086 A | 1/1992 | Steiner ......................... 324/533 |
| 5,128,619 A | 7/1992 | Bjork et al. ................... 324/533 |
| 5,134,377 A * | 7/1992 | Reddy et al. ................. 324/533 |
| 5,272,439 A * | 12/1993 | Mashikian et al. .......... 324/520 |
| 5,343,461 A | 8/1994 | Barton et al. .................. 370/13 |
| 5,369,366 A | 11/1994 | Piesinger ..................... 324/533 |
| 5,461,318 A * | 10/1995 | Borchert et al. ............. 324/532 |

(List continued on next page.)

FOREIGN PATENT DOCUMENTS

WO   WO 00/27134   5/2000

OTHER PUBLICATIONS

"Digital Wideband Unit (DWU)"—DigiTest Architecture—The Goods—www.tollgrade.com, Apr. 1997.
"Telecommunications Engineering and Operations: Network Challenges, Business Issues, and Current Developments", Comprehensive Report, presented by the International Engineering Consortium, Next Generation Copper Testing, S. Grady R. DeMeyer; Implem entation of Network Testing, J. Newbrough.; pp. 125–139, Oct. 1997.
"Mechanized Loop Testing Strategies and Techniques", F. J. Uhrane,The Bell System Technical Journal, vol. 61, No. 6, Jul.–Aug. 1982, pp. 1209–1234.

(List continued on next page.)

Primary Examiner—N. Le
Assistant Examiner—Anjan K. Deb
(74) Attorney, Agent, or Firm—Joseph Giordano

(57) ABSTRACT

A method and system for determining the make-up of a subscriber loop having sending pulses onto a loop and acquiring data based on received echo signals. Determining from the received echoes each discontinuity on the loop and, based on each discontinuity, determining a channel transfer function for each loop section preceding the discontinuity. The transfer function is then used to synthesize an inverse filter. The inverse filter and acquired data are convolved for all the loop sections preceding the discontinuity. The method may be further improved by modeling real and spurious echoes and subtracting these echoes from the echoes generated in the loop.

14 Claims, 12 Drawing Sheets

U.S. PATENT DOCUMENTS

| | | | |
|---|---|---|---|
| 5,465,287 A | 11/1995 | Egozi | 379/5 |
| 5,481,195 A | 1/1996 | Meyer | 324/534 |
| 5,629,628 A | 5/1997 | Hinds et al. | 324/628 |
| 5,699,402 A | 12/1997 | Bauer et al. | 379/26 |
| 5,956,386 A | 9/1999 | Miller | 379/27 |
| 5,978,449 A | 11/1999 | Needle | 379/6 |
| 5,982,412 A | 11/1999 | Nulty | 348/6 |
| 6,026,145 A * | 2/2000 | Bauer et al. | 324/523 |
| 6,091,713 A | 7/2000 | Lechleider et al. | 370/248 |
| 6,177,801 B1 * | 1/2001 | Chong | 324/520 |
| 6,317,495 B1 * | 11/2001 | Gaikwad et al. | 370/201 |

OTHER PUBLICATIONS

"Mechanized Loop Testing Design", O. B. Dale, T. W. Robinson, E. J. Theriot, The Bell System Technical Journal, vol. 61, No. 6, Jul.–Aug. 1982, pp. 1235–1256.

"Second–Generation Mechanized Loop Testing System—A Distributed Microprocessor Application", H. Rubin, The Bell System Technical Joulrnal vol. 61, No. 6, Jul.–Aug. 1982, pp. 1257–1274.

"Time Domain Reflectometry Applications for Telephony", Tektronix, Inc., Communications Network Analyzers, Tektronix ATest and Measurement, pp. 1–9, Nov. 1989.

"America's Network—Line Dancing with DSL", Shira Levine, Provisioning, Jan. 1, 2000.

"Telephone Access Network Measurements", Todd Baker, Rick Puckett, Tektronix, pp. 1–74, Nov. 1997.

"1503C Metallic Time–Domain Reflectomer, 070–7323–04", Tektronix, User Manual, firmware version 5.02 and above, 1997 revised Nov. 1998.

* cited by examiner

SINGLE ENDED MEASUREMENT METHOD AND SYSTEM FOR DETERMINING SUBSCRIBER LOOP MAKE UP

RELATED APPLICATION

The present application claims the benefit of U.S. Provisional Application Number 60/141,121 filed on Jun. 25, 1999 and entitled "An Algorithmic Approach to the Problem of Loop Make-Up Identification Via Single Ended Measurements". The present application is related to U.S Provisional Application No. 60/157,094 filed on Sep. 30, 1999, entitled "Method and Circuitry for Measuring Weak Echoes on Subscriber Loops" and U.S. application No. 09/676,881 filed on Sep. 29,2000, entitled "Method for Determining Subscriber Loop Make-Up", both of which are assigned to the assignee of the present invention.

FIELD OF THE INVENTION

The present invention generally relates to determining the make-up of subscriber loops in the public switched network and more specifically to methods and systems that determine the make-up of subscriber loops via single ended measurements.

BACKGROUND

The mainstay of the telephone company local network is the local subscriber loop. The great majority of residential customers, and many business customers, are served by metallic twisted pair cables connected from a local switch in the central office to the subscriber's telephones. When customers request service, request a change in service, or drop service, these facilities must be appropriately connected or arranged in the field, referred to as the "outside plant," and telephone companies have specially trained craft dedicated full time to this task. Obviously a company needs to have an understanding of its subscriber loops including where they are connected and the location of the flexibility points such as junction boxes, etc. These records historically were kept on paper, called "plats," and more recently are manually entered into a computer database. However, even when entered into a database there are still problems associated with keeping the records accurate and up-to-date.

Having accurate records of the loop plant is critically important to many aspects of a telephone company's business. In addition to the need for accurate records to provide traditional voice services, there will be a need for even more accurate and more detailed records in order to deploy a whole new class of "xDSL" based services, including those based on integrated services digital network (ISDN), high-rate digital subscriber line (HDSL), asymmetrical digital subscriber lines (ADSL) and very high rate digital subscriber lines (VDSL) technology. These technologies are engineered to operate over a class of subscriber loops, such as nonloaded loops (18 kft), or Carrier Serving Area (CSA) loops (9 to 12 kft). In fact, the need to be able to "qualify" a loop for provision of one of these technologies is becoming critical, as the technologies emerge and deployment begins. The ability to easily and accurately qualify loops will allow telephone companies to offer a whole range of new services; problems and high expenses associated with qualifying loops can potentially inhibit deployment and/or lower or forego associated new revenues. The unscreened multipair cables in the existing subscriber loop network constitute the main access connection of telephone users to the telephone network. Recently, the demand for new services such as data, image and video has increased tremendously, and telephone companies have planned to deliver broadband ISDN services via fiber optic local loops. However, the deployment of fiber optic cables in the access plant will require at least twenty years, so that, in the meantime, it is extremely important to fully exploit the existing copper cable plant.

Although there are many different digital subscriber line services, for example, ISDN basic access, HDSL, ADSL, VDSL, and Synchronous DSL (SDSL), these services are not always available to every customer since copper lines seem to present more problems than expected. In fact, the cable length and the presence of load coils and bridged taps may deeply affect the performance of DSL services. Unfortunately, loop records are unreliable and often don't match the actual loop configuration, so that the existing databases cannot be fully exploited.

Loop prequalification is an important issue not only because it can help an economic deployment of DSL services, but also because it can help telephone companies in updating and correcting their loop-plant records. From this point of view, the feasibility of accurate loop make-up identification would have a much higher economic value than simple DSL qualification.

One way to obtain accurate loop records is to manually examine the existing records and update them if they are missing or inaccurate. This technique is expensive and time consuming. Furthermore, new technologies such as xDSL require additional information that was previously not kept for voice services, so there is the potential that new information needs to be added to all existing loop records. Test set manufacturers offer measurement devices that can greatly facilitate this process, but typically they require a remote craft dispatch.

Another way to obtain accurate loop records is by performing a loop pre-qualification test. There are essentially two ways of carrying out a loop pre-qualification test: double ended or single ended measurements. Double-ended measurements allow us to easily estimate the impulse response of a loop by using properly designed training sequences. Double-ended testing, however, requires equipment at both ends of the loop. Specifically, in addition to equipment at the Central Office (CO) or near end of the loop, double ended testing involves either the presence of a test device at the far end of the loop (Smart Jack or MTU) or dispatching a technician to the subscriber's location (SL) to install a modem that communicates with the reference modem in the CO. An exemplary double ended system and method that extrapolate voice band information to determine DSL service capability for a subscriber loop are described in Lechleider et al. U.S. Pat. No. 6,091,713, issued Jul. 18, 2000, entitled "Method and System for Estimating the Ability of a Subscriber Loop to Support Broadband Services" (which is assigned to the assignee of the present invention).

In contrast, single ended tests are less expensive and time consuming than double-ended tests. Furthermore, single-ended testing requires test-equipment only at the CO. In fact, no technician dispatching is required and the CO can perform all the tests in a batch mode, exploiting the metallic access with full-splitting capability on the customer's line. An example of such a single ended test system is the "MLT" (Mechanized Loop Testing) product that is included as part of the widely deployed automated loop testing system originally developed by the Bell System. The MLT system utilizes a metallic test bus and full-splitting metallic access relays on line card electronics. By this means, a given subscriber loop can be taken out of service and routed, metallically, to a centralized test head, where single-ended measurements can be made on the customer's loop. The test head runs through a battery of tests aimed at maintaining and diagnosing the customer's narrowband (4kHz) voice service, e.g., looking for valid termination signatures via application of DC and AC voltages. This system is highly mechanized, highly efficient, and almost universally deployed. In addition, the MLT system is linked to a Line Monitoring Operating System (LMOS) thereby providing a means to access and update loop records which are useful in responding to customer service requests or complaints. However, because this system exclusively focuses on narrowband voice services, the system misses important loop make-up features that will be deleterious to supporting broadband services via DSL technologies.

Another well known single-ended measurement technique relies on the observation of echoes that are produced by medium discontinuities to fully characterize the link. Specifically, these single ended measurements typically rely on time domain reflectometry (TDR). TDR measurements are analogous to radar measurements in terms of the physical principles at work. TDR test systems transmit pulses of energy down the metallic cable being investigated and, once these pulses encounter a discontinuity on the cable, a portion of the transmitted energy is reflected or echoed back to a receiver on the test system. The elapsed time of arrival of the echo pulse determines its location, while the shape and polarity of the echo pulse(s) provide a signature identifying the type of discontinuity that caused the reflection or echo. Basically, if the reflecting discontinuity causes an increase in impedance, the echo pulse's polarity is positive; if the reflecting discontinuity causes a decrease in impedance, the echo pulse's polarity is negative. A bridged tap, for example, produces a negative echo at the location of the tap and a positive echo at the end of the bridged tap. Accordingly, a trained craftsperson is able to determine the type of fault based on the shape, polarity, and sequence of pulses.

Nevertheless, TDR methods (or, in general, single ended measurements that rely on echo pulse signatures) are inaccurate and provide ambiguous results that even the most skillful craftsperson cannot interpret. Because the arrival of echoes is dependent on the location of the discontinuities (or faults) one echo can be masked by another echo if the echoes overlap. For example, FIG. 1A illustrates an exemplary loop having three discontinuities, two of which are bridged taps 500 feet apart. In accordance with TDR methods, a pulse 10 is sent from CO 13 to subscriber location 15 on the subscriber loop segments 20, 22, 24, and 26. As the pulse traverses the loop, it encounters a gauge change 30, a first bridged tap 32, and a second bridged tap 34 before arriving at SL 15. FIGB. 1B depicts the echo pulses caused by the bridged taps 32 and 34 (the echoes generated at the gauge change 30 and SL 15 were filtered out from FIG. 1B). As FIG. 1B shows it is not possible to detect the two-bridged taps via prior art TDR methods. In fact, looking at FIG. 1B, it appears as if only one bridged tap 32 is present since there is only one negative 70-positive 80 transition. However, since the positive echo 80 is not weaker than the negative one 70 (as it usually is for bridged taps), it may be induced that either the bridged tap is very short or several bridge taps are present. However, since the width of the positive echo 80 looks very large, it is very unlikely that it was a short bridged tap since a short bridged tap would introduce a small amount of distortion and, consequently, a narrower pulse. Therefore, the case of several bridged taps may be the most probable, although we cannot say how many there are. As such, TDR methods can produce ambiguous results.

In addition, prior art TDR methods do not take into account and, more specifically, are unable to isolate the effects of spurious pulses. That is, with reference to FIG. 1A, as pulse 10 arrives at gauge change 30, a portion of pulse 10 is reflected to generate a first real echo, and the remaining portion (or refracted portion) travels toward bridged tap 32. At bridged tap 32, reflection and refraction again occur in the process of producing a second real echo. This second echo pulse (traveling upstream to CO 13) is then reflected at gauge change 30 back to bridged tap 32 where a spurious echo pulse is reflected to the CO 13. Although spurious echoes will be more attenuated than real echoes, they are added and overlapped to the real echoes causing the real echo signals to be distorted. Accordingly, spurious echoes enhance the ambiguity inherent in T DR measurements because the shape of the echo is used to interpret the type of fault that causes the echo. In other words, a craft person interpreting a TDR measurement analyzes a distorted trace that does not distinguish spurious echo distortion. More importantly, the effects of spurious echoes on the pulse shape cannot always be interpreted via human visual inspection.

Of utility then is a method and system for unambiguously and completely determining a subscriber loop make-up including detecting the presence and location of load coils, gauge changes, and bridged taps and the length of the loop including the length of each bridged tap.

SUMMARY

Our invention is a method and system for unambiguously and completely determining a subscriber loop make-up.

In accordance with an aspect of our invention the narrowband test head and associated measurements that are included as part of prior mechanized loop test system may be augmented and/or replaced with a broadband test head and associated measurements. By using a broadband test head and signal processing algorithms our invention advantageously allows automated measurements of any subscriber loop that completely determine the loop make-up.

In accordance with an object of our invention, existing loop records can be checked. Specifically, because our invention can be automated, loop make-ups can be methodically obtained and then compared to existing database records. More likely, because we expect the information to be more accurate and detailed than the existing records, the new data will simply replace existing data and populate the database. Thus, through an entirely mechanized process, a telephone network or service provider can completely update its records. Having an up-to-date database will help the provider in its day-to-day business operation, and may also position it to cost-effectively meet requirements imposed as a result of "loop unbundling" rulings resulting from the Telecom Act of 1996.

In accordance with an additional object of our invention, loop make-ups can be advantageously used by another mechanized system to calculate and qualify the ability of a given loop to support advanced DSL services. A computer system can take the loop make-ups, models of the various DSL systems, and standards for spectral compatibility and determine very precisely the service level of a given subscriber. Such determination is likely to be achievable in real-time, for example in response to a service agent's query while on the phone with a customer.

In accordance with another object of our invention, additional information will be determined regarding the noise environment a particular loop is exposed to. This noise may be analyzed and identified, further facilitating the service provisioning process, identifying noise sources exceeding spectral compatibility requirements, and generally facilitating maintenance and administration.

Our broadband test head method includes the steps of sending at least one pulse on the loop, receiving the echoes generated when the pulse encounters a discontinuity, and processing the received echoes to determine the type and location of each discontinuity. Our processing method starts at the central office having access to the loop and moves along the loop to the subscriber location. As we move out along the loop we compute the transfer function for each preceding loop section (excluding bridged taps), synthesize a filter based on the transfer function, and convolve the synthesized filter with the echo data.

Our invention can be implemented in either a distributed or non-distributed embodiment or architecture. In the distributed architecture the functions of data acquisition and processing are done at different locations, whereas in the non-distributed architecture each of these functions are done at the same location, preferably by the same equipment. In either embodiment our method can be used to completely determine the loop make-up.

DETAILED DESCRIPTION

1. System and Broadband Test Head

Figure 1A:
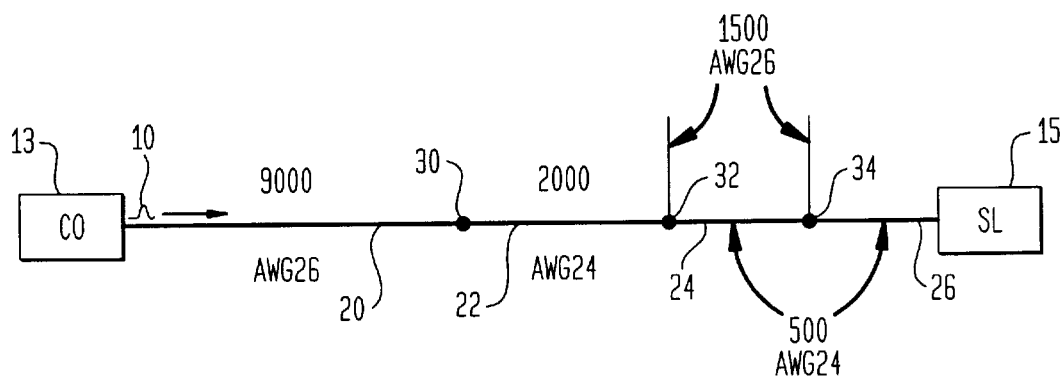
FIG. 1A depicts-an exemplary subscriber loop being tested by time domain reflectometry.
Figure 1B:
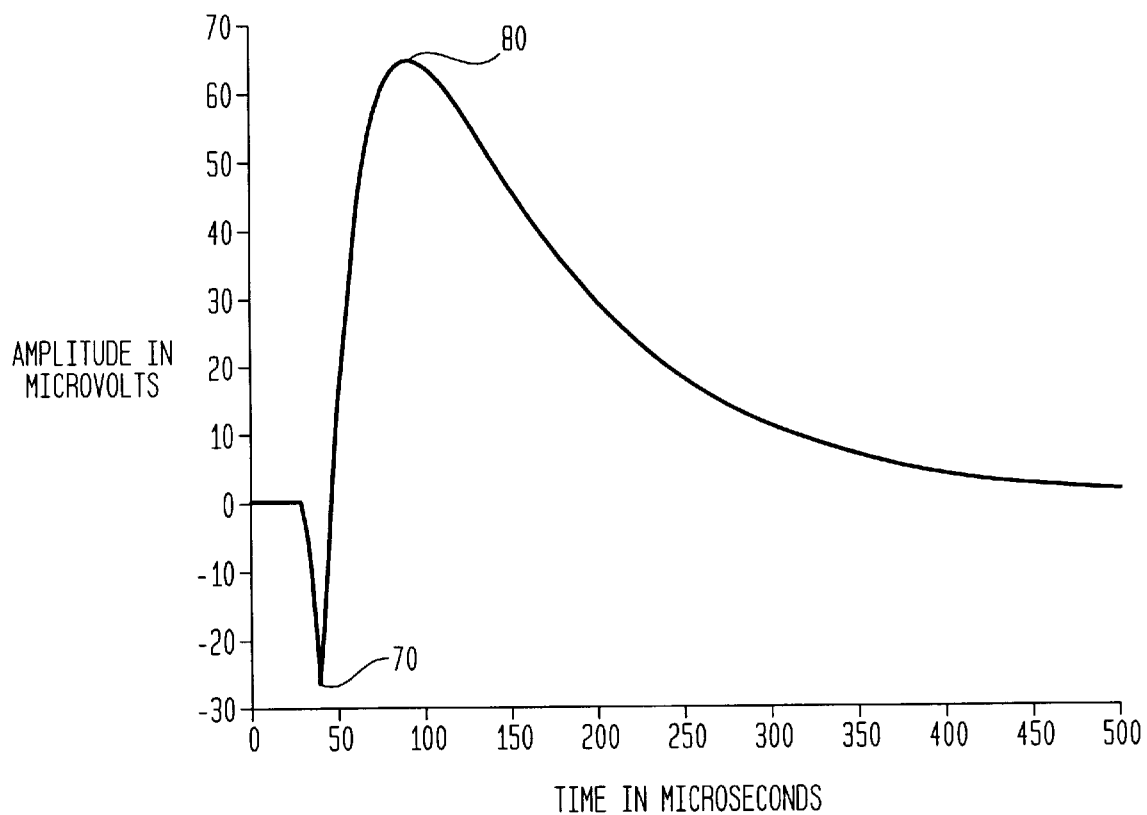
FIG. 1B cts the echo responses from the bridged taps of FIG. 1A.
Figure 2A:
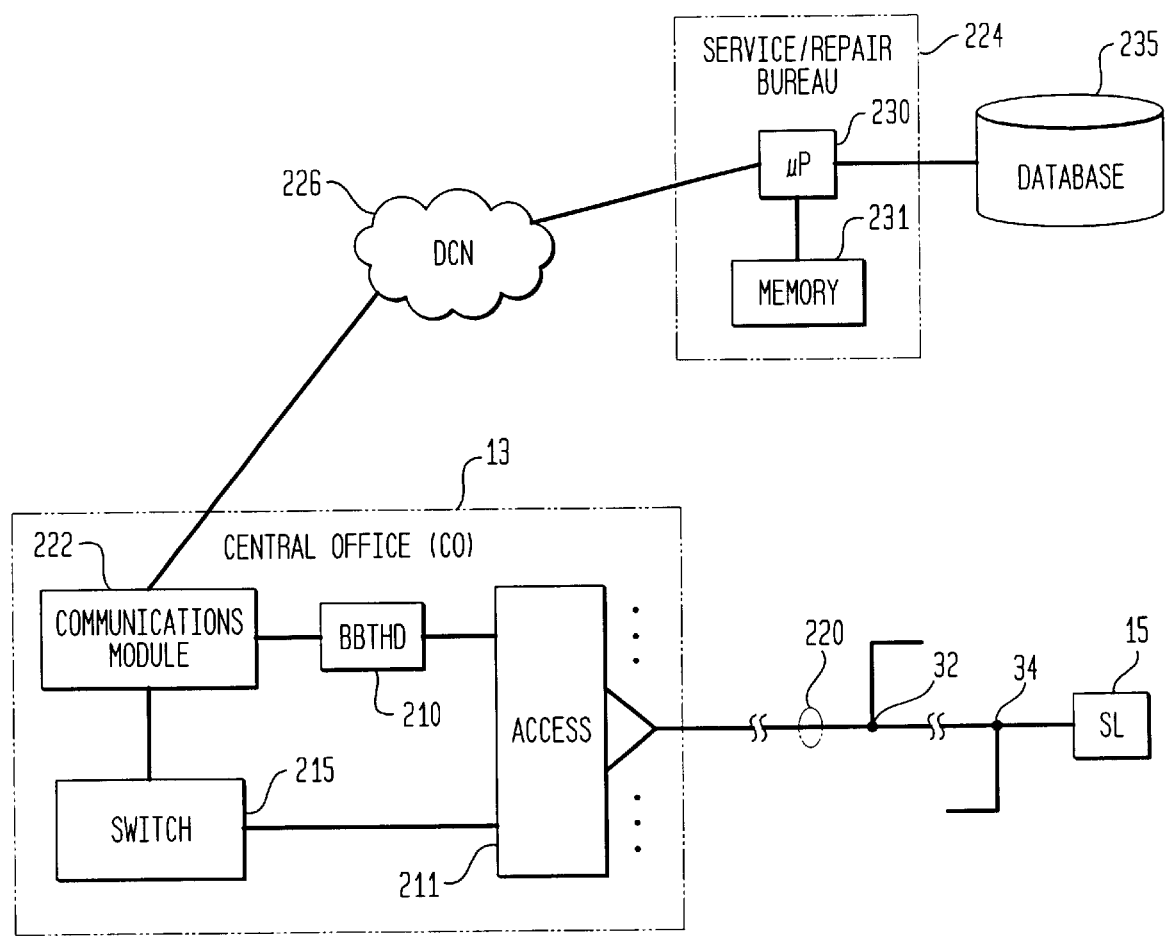
FIG. 2A (depicts an illustrative embodiment of our broadband test head system for determining a subviber loop make-up in accordance with our invention.
Figure 2B:
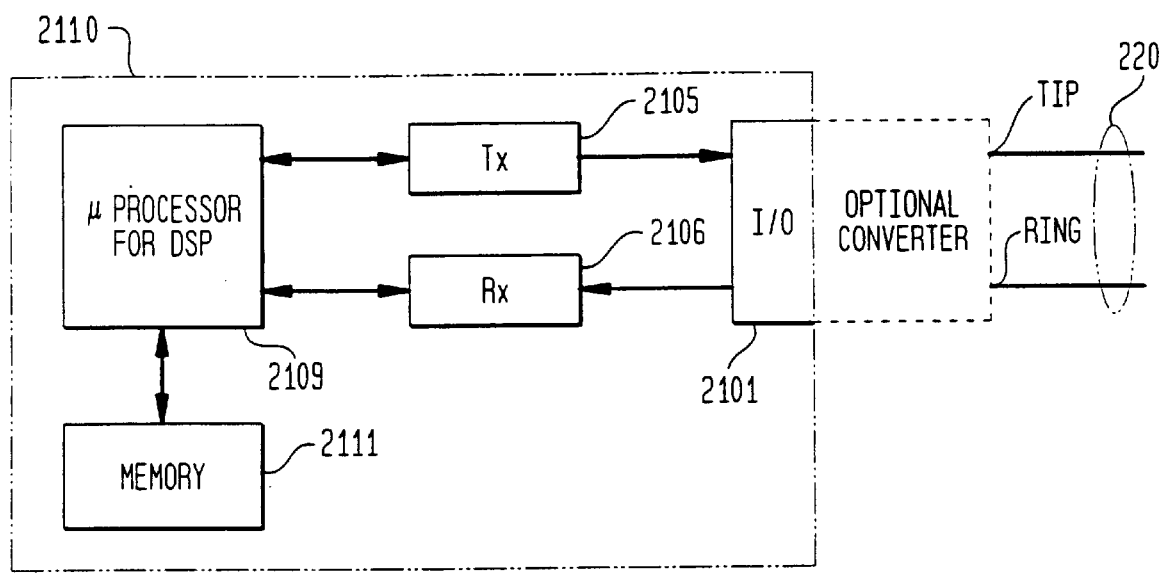
FIG. 2B illustratively depicts another illustrative embodiment of a broadband test head in accordance with thy present invention.

Turning now to FIG. 2A, there is depicted a system for determining a subscriber loop make-up in accordance with an embodiment of our invention. It should be noted that our invention is the unambiguous determination of a loop make-up autonomously, e.g., without the aid of any human intervention. There may be more than one embodiment of a system including our invention. Specifically, FIG. 2A is our invention in a distributed architecture wherein the functions necessary to implement our broadband test head inventive concept is distributed over a network having functional elements at different locations. FIG. 2B is our invention in a non-distributed architecture wherein broadband test head functionality is done at the same location, preferably, on the same equipment.

In accordance with the embodiment depicted in FIG. 2A, a broadband test head device 210 is selectively coupled through access module 211 by switch 215 to subscriber loop 220. Switch 215 determines which subscriber loop 220 should be coupled to broadband test head device 210 in response to control messages transmitted to communications module 222 from service/repair center 224 over a data communications network 226. Data communications network is a typical packet data network using any of the commercially available protocols. In accordance with this embodiment of our invention customer loops 220 make-up and DSL service capability may be determined via a mechanized process. In accordance with this embodiment a control message is sent from bureau 224 instructing switch 215 to provide loop access to broadband test head device 210. Once broadband test head device 210 accesses the loop 220, the test head device 210 sends at least one pulse of a predetermined duration onto the loop 220 thereby causing echoes at the various discontinuities existing on the loop 220. The resulting echoes are subsequently received at device 210 and used to determine loop make-up in accordance with our invention.

As far as the choice of a probing signal is concerned, several choices are possible. For example, it is know in the prior art that a half-sine pulse is a good choice and this pulse is used in today's high resolution TDRs. A square pulse may also be used, although it is commonly claimed that the half-sine pulse leads to higher echo resolution than the square pulse. However, this may not necessarily be true and both probing signals yield similar responses. However, there may be a practical advantage in using a half-sine pulse instead of a square pulse. In fact, a half-sine pulse has more energy at low frequencies than a square pulse and this property has a twofold advantage. First, it may be more useful to detect gauge changes since the reflection coefficient of a gauge change is characterized by a low-pass behavior. Secondly, injecting low frequency pulses in the pair under test would cause less crosstalk in adjacent pairs that, at the time of the test, may be supporting DSL services. Another advantage of using a half-sine pulse is that it is easier, from an implementation point of view, to generate "cleaner" high-amplitude half-sine pulses instead of high-amplitude square pulses. However, except for the above mentioned practical advantages there is no conceptual difference between the echo response to a square pulse or to a half-sine pulse.

In accordance with this embodiment of our invention, the processing necessary to determine the make up of the loop 220 is not done in central office 13 (the access CO) but instead is done at service bureau 224. Specifically, device 210, in addition to having means for transmitting and receiving pulses also includes means transmitting the acquired data to communications module 222. The signals received at module 222 are transmitted over the data communications network to bureau 224. At bureau 224, a processor 230 running the method steps below (and that are stored on memory 231) can completely determine loop make-up. In accordance with this distributed processing embodiment of our invention, loop make-up is determined in batch mode. That is, data may be acquired for a plurality of loops, send to bureau 224, and processed at a later time. This embodiment is particularly advantageous for off-peak hour loop make-up determination so as not to disrupt customer service.

At bureau 224 the loop make-ups, as determined in accordance with our invention, are then used to replace or update existing records in a database 235, or if no records exist, the new make-up is stored as a record in the database 235. It should be noted that the system of FIG. 2A is meant to illustrate how our broadband test head invention may be implemented as part of a mechanized loop testing system. In fact, as discussed below, the essential components of our broadband test head and the method of our invention may also be implemented in a metallic time domain reflectometer or in a non-distributed architecture.

Turning now to FIG. 2B, there is depicted a broadband test head 2110 in accordance with a second illustrative embodiment of our invention. The embodiment of FIG. 2B is a non-distributed architecture wherein processing and loop make-up are done at the access location. Here, broadband test head 2110 comprises an input/output interface 2101 that couples the loop 220 tip and ring to a transmitter 2105 and receiver 2106. Transmitter 2105 and receiver 2106 are coupled to a microprocessor 2109. Memory 2111 is coupled to microprocessor 2109 and is used to store the method steps, where applicable of the present invention and may be used to also store results. Although a display is not shown, broadband test head 2110 may also include a display, wherein echo results are displayed, and circuitry for transmitting signals over a data network (as may be required by the embodiment of FIG. 2A). The micro-processor 2109 executes the method steps, where applicable stored in memory 2111 and is used in performing the digital signal processing on the echoes received by receiver 2106. As detailed below, by processing the echoes received at the receiver in accordance with our method the subscriber loop may be more accurately determined.

2. Modelling

In order that our method may be better understood, we will now describe a mathematical model for describing the echoes. This model is used to determine the effect that spurious echoes caused by gauge changes and bridged taps have on determining the loop make-up. The effect of spurious echoes, based on the model, is then included in our method for determining loop make-up.

2.1 Echo Modelling

It can be shown that the echo signals arriving at a Central Office (CO) (or more specifically the broadband test head device receiver) in response to a pulse being sent out on a subscriber loop can be expressed as:

$$r(t) = \sum_i e^{(i)}(t - \xi_i) \quad (1)$$

where $e^{(i)}(t)$ is the $i^{th}$ echo response and $\xi_i$ is the echo arrival time in the CO of the i-th echo. The echo $e^{(i)}(t)$ can be expressed as a function of its echo path impulse response $h_{(ep)}^{(i)}(t)$:

$$e^{(i)}(t) = s(t) * h_{ep}^{(i)}(t), \text{ where } h_{ep}^{(i)}(t) = F^{-1}[K(f) H_{IL}^{(i)}(f) p^{(i)}(f)] \quad (2)$$

In eq.(2), $H_{IL}(f)$ is the insertion loss pertaining to the round trip path from the CO to the discontinuity and back to the CO again, the term K(f) takes into account the role of the transmission coefficients $\tau(f)$ pertaining to previous bridged taps and the reflection coefficient p(f) models the effects of the discontinuity on the incident signal. Each discontinuity present in the loop will generate an echo whose shape will depend both on the kind of discontinuity and on the loop sections on which the echo has traveled. The observed signal r(t) will be the sum of a certain number of echoes that might be overlapping. In fact, even if the probing signal s(t) is a very short pulse, the medium is very dispersive and will broaden the pulse. The longer the loop section, the broader will be the echo received in the CO. The shape of the echoes generated by different discontinuities does not change significantly from discontinuity to discontinuity. The main difference consists in the width of the echo: near discontinuities will generate narrower echoes, whereas far discontinuities will generate broader echoes.

Spurious echoes occur because each discontinuity generates both a reflected and a refracted signal, so that a part of the signal travels back and forth on the line, bouncing between discontinuities, before it arrives at the CO. Obviously, the more the spurious echo travels on the line the more attenuation it will exhibit upon arrival at the CO. However, the effect of these spurious echoes cannot be neglected since, in some instances, spurious echoes generated at a discontinuity may even be stronger than the real echoes generated by the following discontinuities.

More importantly, an accurate analytical model of spurious echoes may be used to generate or synthesize spurious echoes and subtract such generated spurious echoes from the observation data thereby resolving the ambiguities known in the prior art. The generation and subtraction of the spurious echoes from the observation data could be performed step-by-step and in parallel with our identification method described below.

In the following subsections we will analyze the main spurious echoes generated on a loop by a gauge change and a bridged tap. The spurious echoes are modeled as real echoes. For this purpose, we will define their echo path and their reflection coefficient. The transmission coefficient can then be expressed as a function of the reflection coefficient since the following relationship holds: $\tau(f) = 1 + p(f)$. The determination of the echo path is important because it allows us to build the insertion loss transfer function $H_{IL}(f)$ in eq. (2); the reflection coefficient will be constituted of several terms, each of which will account for the consecutive bouncing.

2.1.1 Spurious Echoes: Gauge Changes

Figure 3:
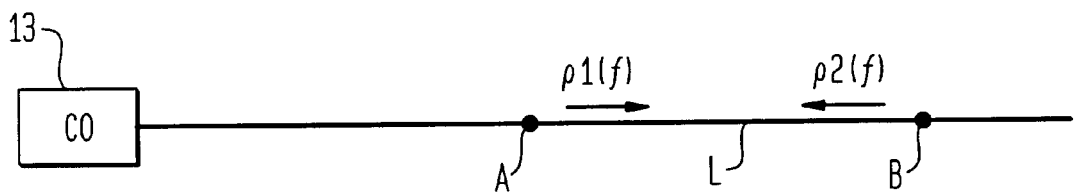
FIG. 3 illustratively depicts an exemplary subscriber loop having a gauge change (labeled A) and a subsequent discontinuity (labeled B) present in the loop.

Turning now to FIG. 3, there is depicted an exemplary subscriber loop wherein two consecutive gauge changes (labeled A and B) are present in the loop. When a signal transmitted from CO 13 arrives at A, an echo is generated and goes back to the CO 13; this is a real echo and pertains to the discontinuity in A. After encountering A, the refracted part of the signal travels on and arrives at B, where another echo is generated in accordance with the reflection coefficient $p_2(f)$ When this second echo arrives back at A, part of it will be refracted and will constitute the real echo pertaining to the discontinuity B and part will be reflected back towards B in accordance with the reflection coefficient $p_1(f)$. Theoretically, the part of signal going back towards B can bounce a infinite number of times between A and B, and, at each bouncing, a refracted and a reflected wave will be generated again. For this reason, an infinite number of spurious echoes will be received in the CO.

Following the notation of the model in eqs. (1) and (2), it is possible to prove that the echo path and the reflection coefficient pertaining to the i-th spurious echo generated by two consecutive gauge changes are given by the following (i >0):

Path=Path from CO to A+2(i+1)L+Path from A to CO (3.a)

$$p(f)=[p_1(f)]^i[p_2(f)]^{i+1} \quad (3.b)$$

Figure 4A:
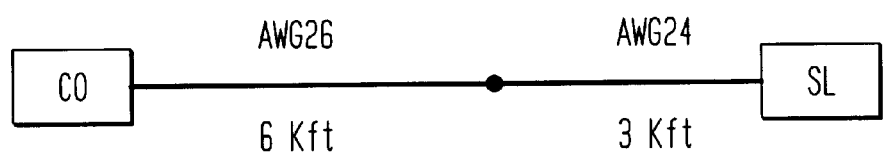
FIG. 4A illustratively depicts an exemplary subscriber loop having a gauge change in the loop.
Figure 4B:
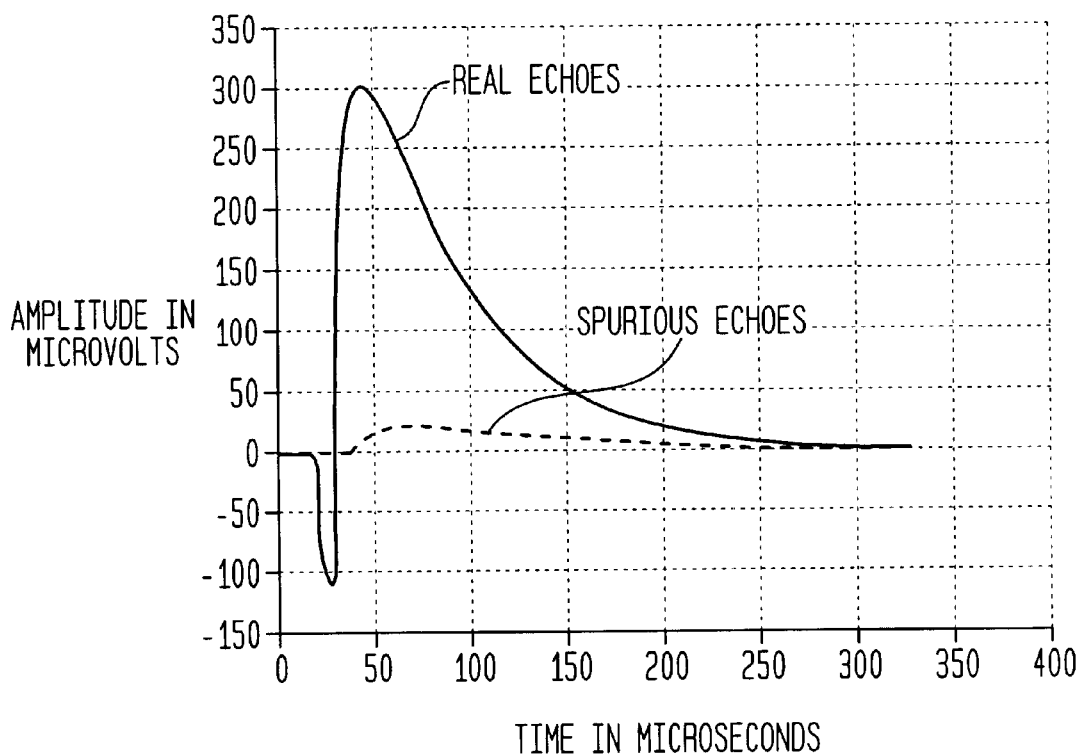
FIG. 4B shows the real and spurious echoes produced by the discontinuity present in the loop shown in FIG. 4A.

Based on eq. 3, we have run simulations and found that spurious echoes due to gauge changes are much more attenuated than real echoes. For example, FIG. 4B shows the real and spurious echoes produced by the discontinuity present in the loop shown in FIG. 4A. In the calculation of the spurious echoes we have considered the first five spurious echoes, i.e. i=1, 2, . . . , 5 as given by eqs.(3.a)–(3.b). As such, ignoring the spurious echoes produced by gauge changes will not have a major effect on the accuracy of our loop make-up method.

2.1.2 Spurious Echoes: Bridged Taps

Figure 5:
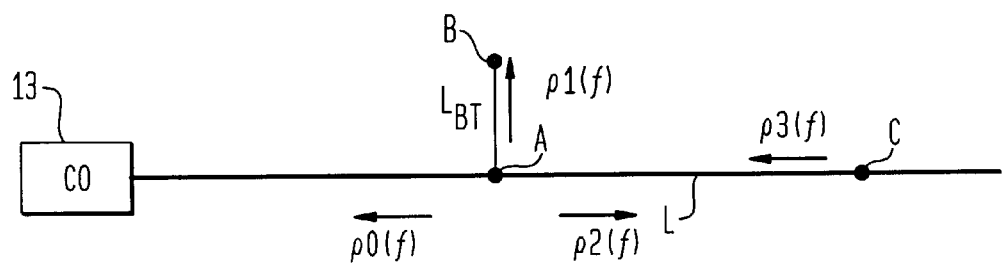
FIG. 5 depicts an exemplary subscriber loop having a bridged tap (labeled A) and a subsequent discontinuity (labeled C) present in the loop.

Turning now to FIG. 5, there is depicted an exemplary subscriber loop having a bridged tap (labeled A) and a gauge change (labeled C) present in the loop. Actually, the last discontinuity C can be either a gauge change or another bridged tap, since its behavior is described by the reflection coefficient $p_3(f)$. When the signal arrives at A, an echo is generated and goes back to the CO 13; this is a real echo and pertains to the discontinuity in A. After encountering A, part of the signal travels on and arrives at B and part travels on arriving at C. In this case, there are three kinds of spurious echoes of importance:

1) the spurious echoes that bounce between A and B and go back to the CO;
2) the spurious echoes that bounce between A and B, travel on towards C and go back to the CO
3) the spurious echoes that bounce between A and C and go back to the CO.

Following the notation of the model in eqs. (1) and (2), the echo paths and the reflection coefficients pertaining to the above mentioned types of echoes are given by the following:

Case 1) (i >0)

Path=Path from CO to A+2(i+1)$L_{BT}$+Path from A to CO (4.a)

$$p(f)=[1+p_0(f)][1+p_1(f)][p_1(f)]^i \quad (4.b)$$

Case 2) (i, j>0)

Path=Path from CO to A+2i$L_{BT}$+2jL+Path from A to CO (5.a)

$$p(f)=[1+p_0(f)][1+p_1(f)][1+p_2(f)][p_1(f)]^{i-1}[p_2(f)]^{j-1}[p_3(f)]^j \quad (5.b)$$

Case 3) (i>0)

Path=Path from CO to A+2(i+1)L+Path from A to CO (6.a)

$$p(f)=[1+p_0(f)][1+p_2(f)][p_2(f)]^i[p_3(f)]^{i+1} \quad (6.b)$$

In the case where the consecutive discontinuities are constituted by the same kind of gauge, the reflection coefficients in (4.b), (5.b) and (6.b) boil down to the following expressions:

Case 1): $\rho(f) = \dfrac{4}{9}\left(-\dfrac{1}{3}\right)^i$ (7.a)

Case 2): $\rho(f) = \dfrac{8}{27}\left(-\dfrac{1}{3}\right)^{i+j-2}[\rho_3(f)]^j$ (7.b)

Case 3): $\rho(f) = \dfrac{4}{9}\left(-\dfrac{1}{3}\right)^i[\rho_3(f)]^{i+1}$ (7.c)

Figure 6A:
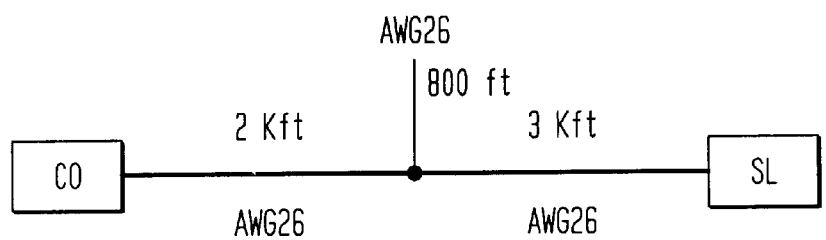
FIG. 6A illustratively depicts an exemplary subscriber loop having a bridged tap in the loop.
Figure 6B:
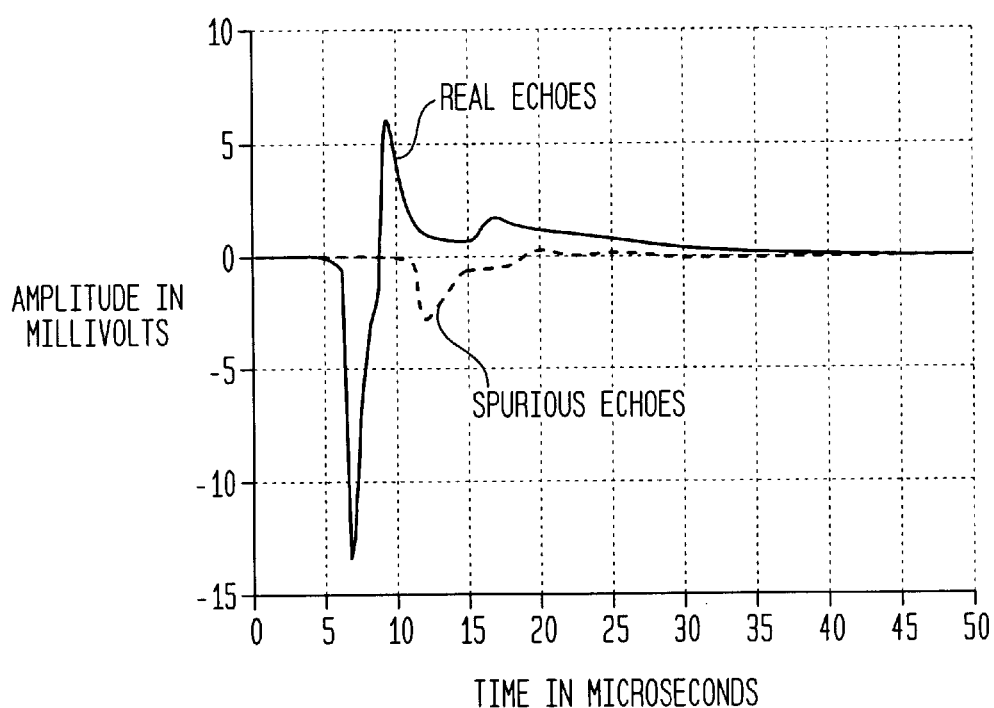
FIG. 6B illustrates a simulation of the real echoes and spurious echoes for the loop configuration in FIG. 6A.

The spurious echoes produced in correspondence to a bridged tap are more harmful than those produced by a gauge change. FIG. 6B shows the real echoes and the first 35 spurious echoes for the loop configuration in FIG. 6A. The 35 spurious echoes we have considered are: 5 echoes of case 1 (i=1, 2, . . . , 5 in eqs. (5.a)–(5.b)), 25 echoes of case 2 (i, j=1, 2, . . . , 5 in eqs. (6.a)–(6.b)) and 5 echoes of type 3 (i=1, 2, . . . , 5 in eqs.(7.a)–(7.b)). The spurious echoes are still smaller than the real ones but much stronger than in the gauge change case and can change the peak sequence, causing the appearance of false peaks. If the bridged tap is longer, the spurious echoes are weaker but so are the real echoes and the peak sequence will experience a change.

3. Determining the Make-Up of a Loop

We now turn to our method for unambiguously determining (or identifying) the make-up of a subscriber loop including identifying the number and location of load coils, bridged taps, and gauge changes.

In the course of our work we have found that if some simple assumptions are satisfied, loop make-up identification may be possible without ambiguity. These assumptions are here summarized:

1. The loop is well behaved, i.e.,(a) the loop is constituted of cables deployed following the regular gauging design rule and (b) only simple bridged taps may be present and the length of each bridged tap is smaller that the length of the following loop-section;
2. The loop is terminated on an on-hook telephone and the impedance of an on-hook telephone can be approximated by an open circuit; and
3. The loop does not have several discontinuities in close proximity concentrated at the end of the loop.

If these assumptions are satisfied, it is possible to identify the loop make-up by just looking at the position and sign of the peaks of the echoes. The rationale or physical principle underlying the above assumption is the realization that the spatial relationship of the discontinuities on the loop manifest themselves in a temporal manner via our measurement or any TDR measurement. Note however, that even if the above assumptions are satisfied, echoes may overlap and it may be possible that some peaks are hidden so that some discontinuities may not be detected. Our method will be able to perform loop make-up identification without any ambiguity if the loop under investigation satisfies the above mentioned four assumptions. For those loops that do not satisfy these assumptions, it will be necessary, as described below, to perform additional steps to resolve the ambiguities, i.e., it may be necessary to resort to sophisticated signal processing techniques.

Our identification process is performed in several steps. At each step some partial information on the loop make-up is calculated and exploited in a subsequent step. At a high level, and as indicated in FIG. 7, the identification process can be divided into four main phases or steps:

1. Phase 1 (Step 710, FIG.7 A): Acquire Data;
2. Phase 2 (Step 720, FIG. 7A): Check Consistency of the Loop Record;
3. Phase 3 (Step 730, FIG. 7A): Perform Active Loop Make-up Identification;
4. Phase 4 (Step 740, FIG. 7A): Resolve Ambiguities.

Once the loop make-up is identified, the loop may then be qualified for DSL service. However, where the loop make-up cannot determined without ambiguity, it is still possible to exploit the information given via our method to determine the quality of DSL services achievable by the loop. In fact, in the case of ambiguous identification, the possible configurations that can be attributed to the loop under test are limited and can be used for DSL qualification purposes. In this scenario, a worst-case quality of service can be determined.

In the following sub-sections, we will describe the functions or steps performed in each phase.

3.1 Phase 1 (Step 710): Acquire Data

Figure 7A:
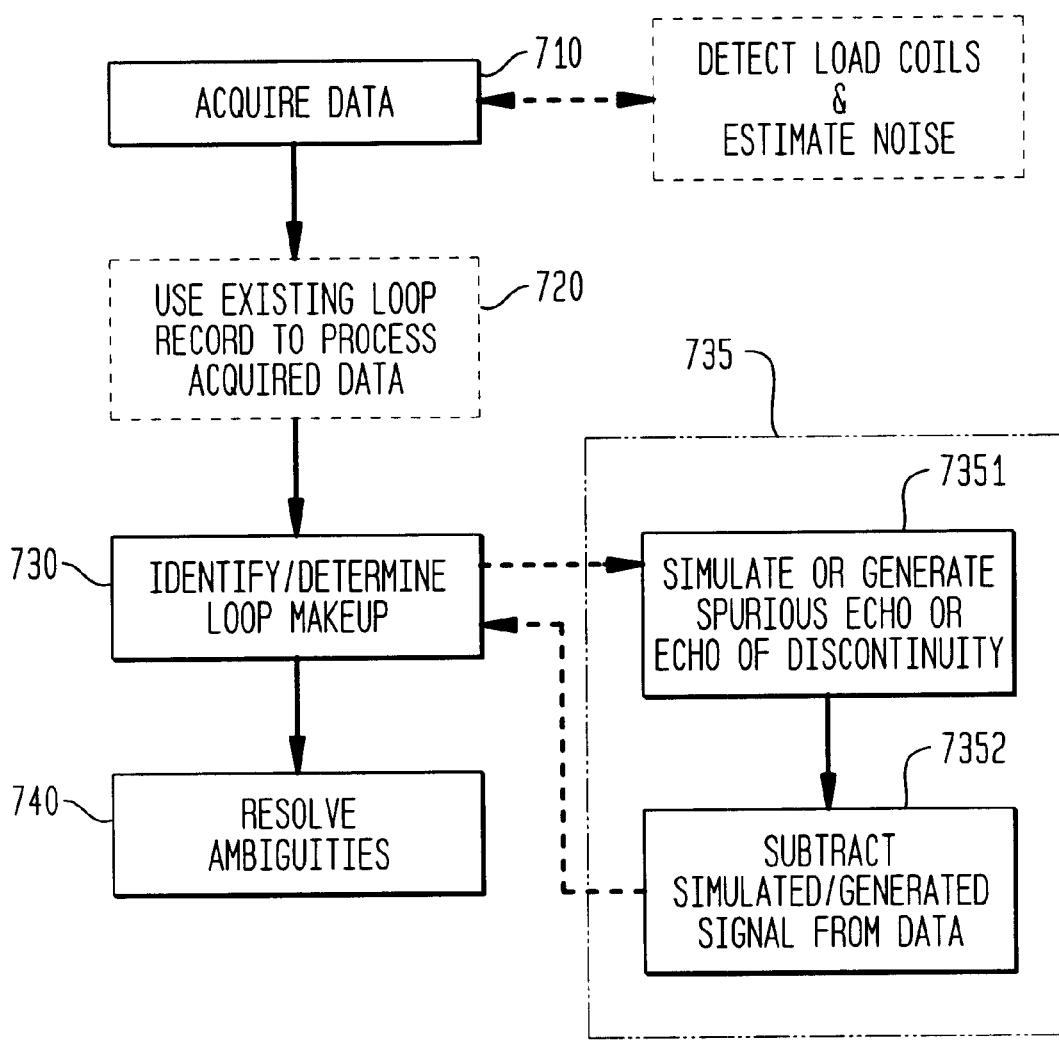
FIG. 7A illustrates the method steps of our invention.

As FIG. 7A shows at the same time data is being acquired, step 710, it is also possible, but not required in accordance with our invention, to detect the presence of load coils and estimate the noise on the loop under tests, step 712. Step 712 is optional. Nonetheless, given that the commercial driver behind unambiguously determining the make-up of a loop is deployment of DSL services step 712 will be required in most cases and by almost all users of the embodiments depicted in FIG. 2. However, in implementing our inventive concept load coil detection and noise estimation are not to be considered necessary steps.

Figure 7B:
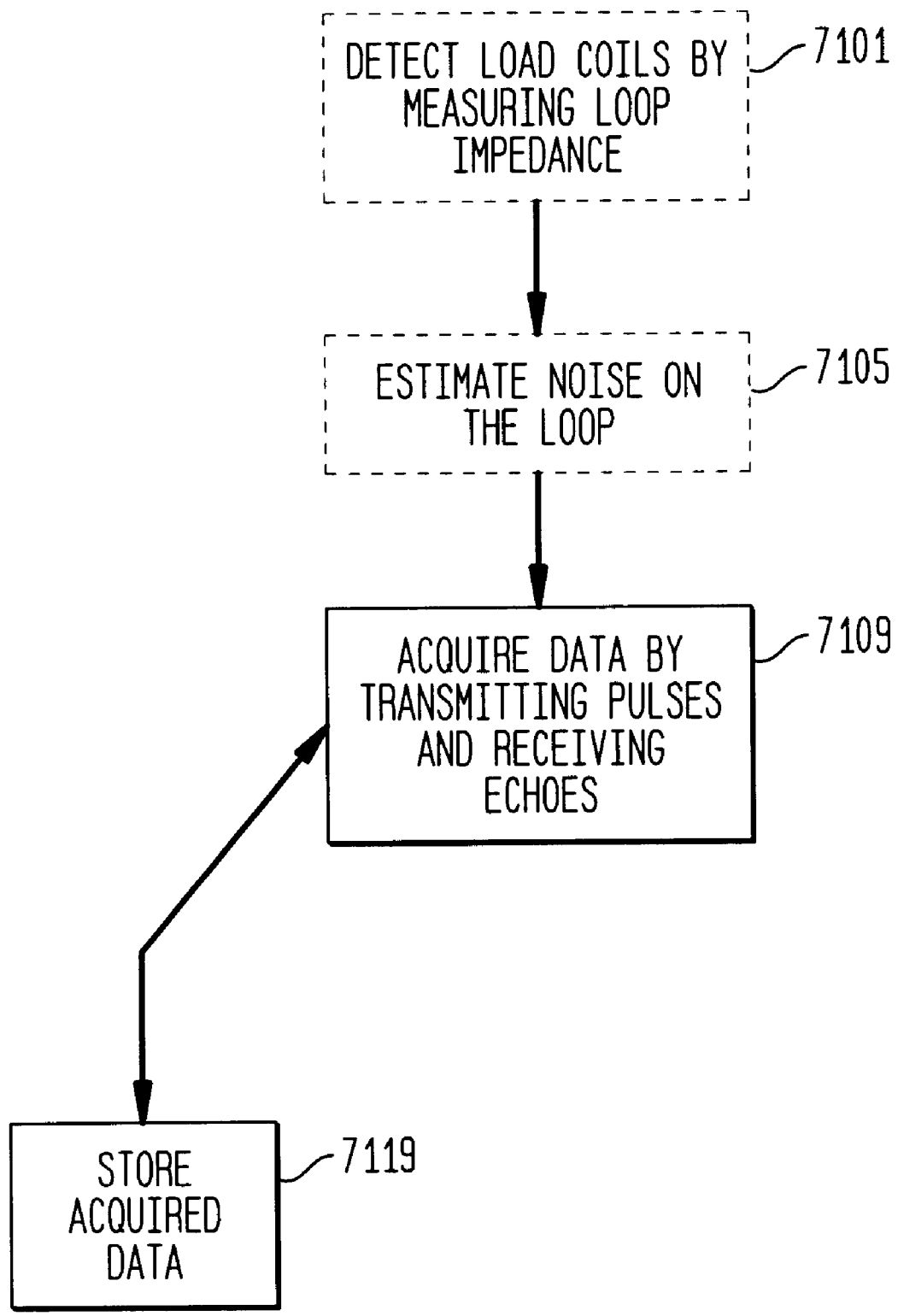
FIG. 7B illustrates the substeps of step 710 of FIG. 7A.

Turning to FIG. 7B, there is illustrated the main sub-steps performed in this phase, including the optional steps of load coil detection and noise estimation. Specifically, FIG. 7B illustrates the substeps of detecting of load coils, step or block 7101, estimation of the noise present on the loop, step 7105, and repetitive transmission of suitably designed probing signals into the loop and sampling of the received echoes, step 7109. In addition, and in accordance with our method, the echoes received at step 7109, may be stored in memory, step 7119. In the embodiment depicted in FIG. 2A, the received echoes may be transmitted back to the service bureau and stored (step 7119) for later processing. Or in the embodiment of FIG. 2B, the received echoes may be stored (step 7119) in local memory 2111 on the broadband test head 210.

In order to detect loading coils along the line, we measure the input impedance of the loop from a few hertz to a few kilohertz; measuring the impedance of a loop is well known in the art and any prior art method may be used to perform this step. It is known that the presence of loading coils is detected if the behavior of the input impedance versus frequency exhibits peaks. If the input impedance of the loop is a decreasing monotonic function of frequency, the loop is unloaded. If load coils are detected, the loop cannot support DSL services (as is known in the art).

The prior art contains methods for estimating noise on a loop and any of those methods may be used here. Noise estimation is important because the knowledge of the noise level will determine the number of independent snapshots required via repetitive probing, step 7109, in order to achieve the desired Signal-to-Noise Ratio (SNR). In fact, given that safety, service, and customer satisfaction requirements place an upper limit on the energy that can be transmitted on a loop, repetitive probing allows us to maintain energy levels below safety requirements and, at the same time, allows to achieve desired Signal-to-Noise Ratio. The process of noise estimation can be limited to a second order description of the noise process which may be useful when processing the acquired data for the resolution of the echoes. A second order description is sufficient because of the Gaussian nature of the noise and may be necessary since crosstalk may introduce colored components in the noise spectrum; crosstalk may be present because DSL services might be running on pairs adjacent to the pair under test.

As far as the choice of the probing signal is concerned, a compromise on the width of the probing signal will need to be made: short pulses give rise to narrow echoes, whereas long pulses are able to reach longer distances.

Those of ordinary skill in the art will also note that metallic access to the cable pair or subscriber loop is needed only in this step, step 710. Therefore, the loop is physically disconnected from the customer only during step 710 and then typically only for a number of seconds. Once the data is acquired, the line can be given back to the customer since all the further processing can be made in a batch mode off line.

3.2 Phase 2 (Optional Step 720): Compare Acquired Data to Loop Record

Step 720 is an optional step. In step 720 we compare available loop records to the previously acquired data. This proves to be a useful way of verifying the reliability of a pre-existing loop record for the loop under test.

In particular, at step 720 the correctness of the loop record is verified by comparing the loop record with acquired data. Accordingly, we process the data and use accurate time windowing to detect if a certain discontinuity is located where the records indicate. The verification process will analyze all the discontinuities indicated in the records starting with the ones nearer to the CO. This consistency check will provide the following phase with some partial information on the loop make-up. In fact, even though most of the records are not updated and, therefore, unreliable, it is reasonable to assume that at least some of the information in the database is correct.

3.3 Phase 3 (Step 730):Perform Active Loop Make-up Identification

During active loop make-up identification, step 730, the data gathered during step 710 is analyzed and a first attempt to identify the loop make-up is made. If the consistency check of the records was able to provide some a priori knowledge on the loop, this information is used during the identification process.

The basic parameters to be identified in this phase are the estimation of the time of arrival of the echo and its amplitude. The information on the time of arrival is necessary for the determination of the location of the discontinuity. Electric signals propagate in a loop at a speed of approximately 1.5 µs per kilofeet, so the time of arrival of an echo allows us to locate the distance of the discontinuity from the CO (or broadband test head). The knowledge of the amplitude of the echo is necessary to identify the type of discontinuity that caused the echo. Specifically, the sign of an echo allows us to determine whether the probing signal has passed from a lower to a higher characteristic impedance, or vice versa. In addition, the absolute value of the peak of the echo is useful in determining the kind of gauges present in the loop. In fact, we can state the following rules that provide a signature of the discontinuity:

when a signal passes from a loop section with a higher (lower) characteristic impedance to a loop section with a lower (higher) one, the echo generated at the discontinuity is always negative (positive);

a bridged tap always produces a negative echo followed by a positive echo;

in the case of bridged tap, the absolute value of the negative peak is always higher than the absolute value of the positive peak;

the bigger the difference between the characteristic impedance of two loop sections, the higher the absolute value of the peak generated at the discontinuity.

Basically, our identification method attempts to detect the discontinuities nearer to the CO and, then, moving forward out into the loop detecting, in turn, each discontinuity. The determination of the first echo(es) does not normally present a problem since it (they) will arrive in the CO without being overlapped by previous echoes and because the first spurious echoes will arrive later. However, as the identification process moves forward, detection of the echoes is more difficult. In fact, the echoes will be increasingly weaker, broader and overlapping with each other and with spurious echoes. The main problem of detecting far discontinuities is due to the broadening of the echo caused by the dispersive nature of the medium. In fact, a broad echo could hide a subsequent and weaker echo, making the detection of discontinuities occurring after other discontinuities extremely difficult. A possible way to limit widening effect of the medium is to process the received signal or echoes in the order received to compensate for the dispersive behavior of the medium. In the case of digital communications, the effect of a dispersive channel is to broaden the transmitted pulse thus leading to inter-symbol interference. In digital communications, the solution to the problem of inter-symbol interference is an equalizer, i.e. a device that compensates for the dispersive behavior of the channel. In our case, we have to process a signal that is not digital in nature and this limits our freedom in the choice of the equalizer. In fact, since we cannot act on the digital structure of the signal, the only thing we can do is to act on the channel characteristics. There is only one equalizer that does not take into account the digital structure of a received signal: the zero-forcing equalizer, that in our case turns out to be a filter with a transfer function equal to the inverse of the transfer function of the channel.

On the basis of the above considerations, the identification method should proceed as indicated below and by FIG. 7C:

1. identify the location and type of the $i^{th}$ discontinuity on the loop by processing the received echoes in pairs, step 7301 (processing includes using the echo time of arrival and amplitude and signature rules to determine, respectively, the location and type of discontinuity, step 7302 );

2. compute the transfer function of the first through $i^{th}$ loop sections identified up to now, step 7305 (for i>1, the $i^{th}$ loop section is the loop section between the $(i-1)^{th}$ and $i^{th}$ discontinuities and for i=1, the $i^{th}$ loop section is the loop section between the CO and first discontinuity);

3. synthesize an inverse filter for the $i^{th}$ loop section based on the computed transfer function, step 7309; and 4. operate the convolution between the previously synthesized inverse filter and the observation data, step 7313 (this operation would be best performed in the frequency domain by means of FFT/IFFT techniques);

The above steps are then repeated until the last discontinuity in the loop is found; in other words, if there are N echoes i is incremented from 1 to N. In principle, this procedure is equivalent to "moving" the CO along the line and towards the subscriber's location, thus reducing the distance between the CO and the discontinuity to be identified. It also should be noted that at step 2, bridged taps should not included in the calculation of the transfer function. This is the case because the bridged tap distorts only signals travelling on it and the signals do not travel on the bridged tap. In other words, the cumulative transfer function is meant to take into account the effect each loop section has on signals traversing and signals reflected at discontinuities after the bridged tap do not travel on the bridged tap.

The main drawback of this procedure is the noise enhancement. Due to the characteristic of the transfer function of the twisted-pair channel, the inverse filter will enhance the high frequency components of the noise. This effect should be carefully taken into account when fixing the minimum SNR required. On the other hand, since the correlation introduced in the noise samples is known, we can resort to standard noise reduction techniques.

Figure 8A:
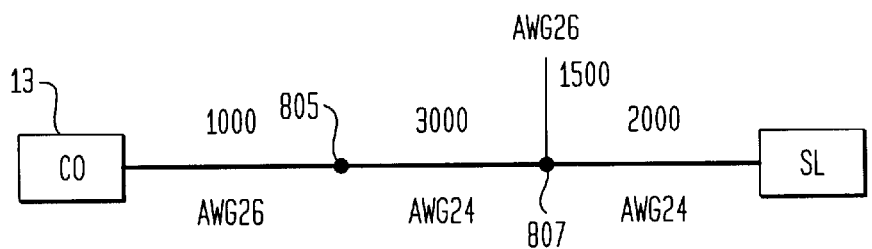
FIG. 8A depicts an exemplary loop used to demonstrate the advantages of our invention.
Figure 8B:
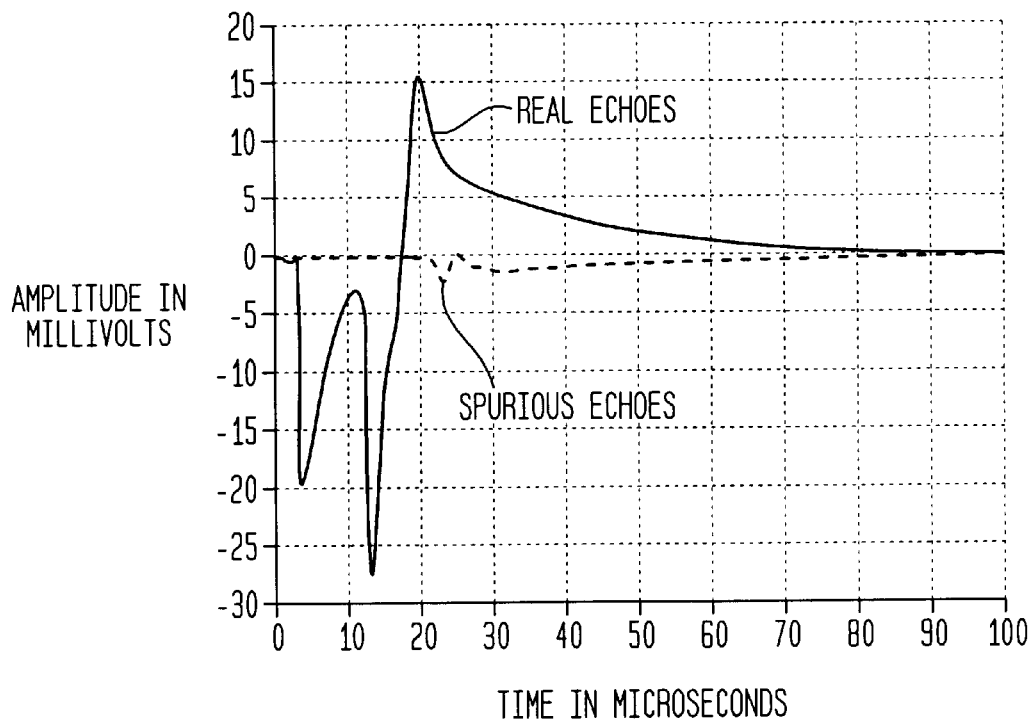
FIG. 8B illustrates a simulation of the echoes generated by the loop of FIG. 8A with the real echoes and spurious echoes shown on separate curves.
Figure 8C:
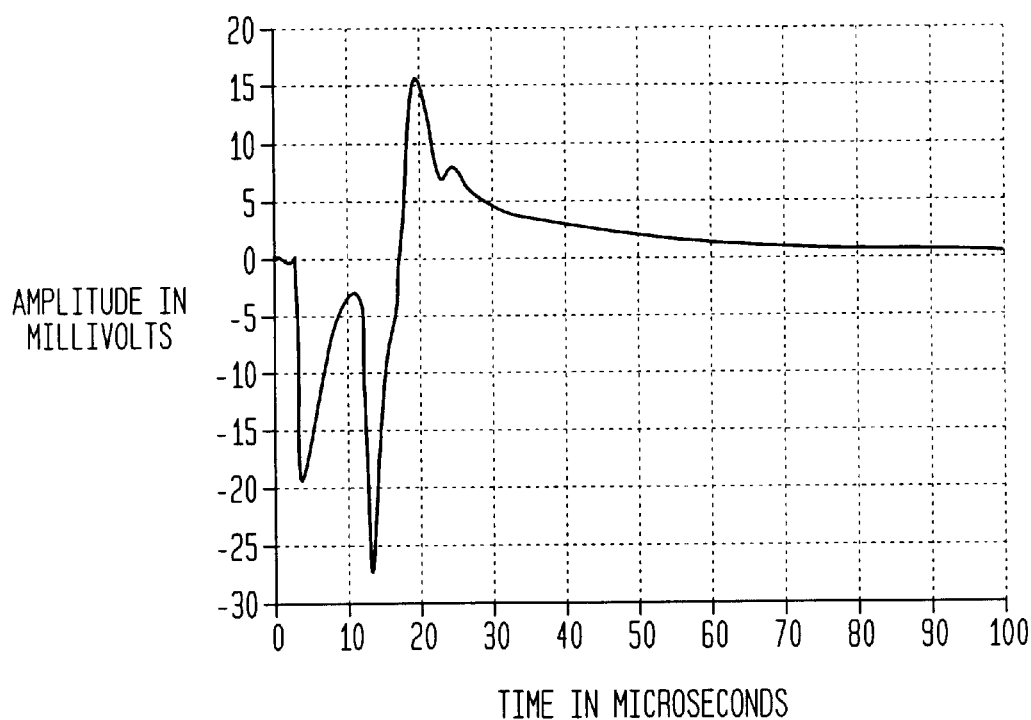
FIG. 8C illustrates a simulation of the echoes generated by the loop of FIG. 8A with the real echoes and spurious echoes shown on the same curve.
Figure 9A:
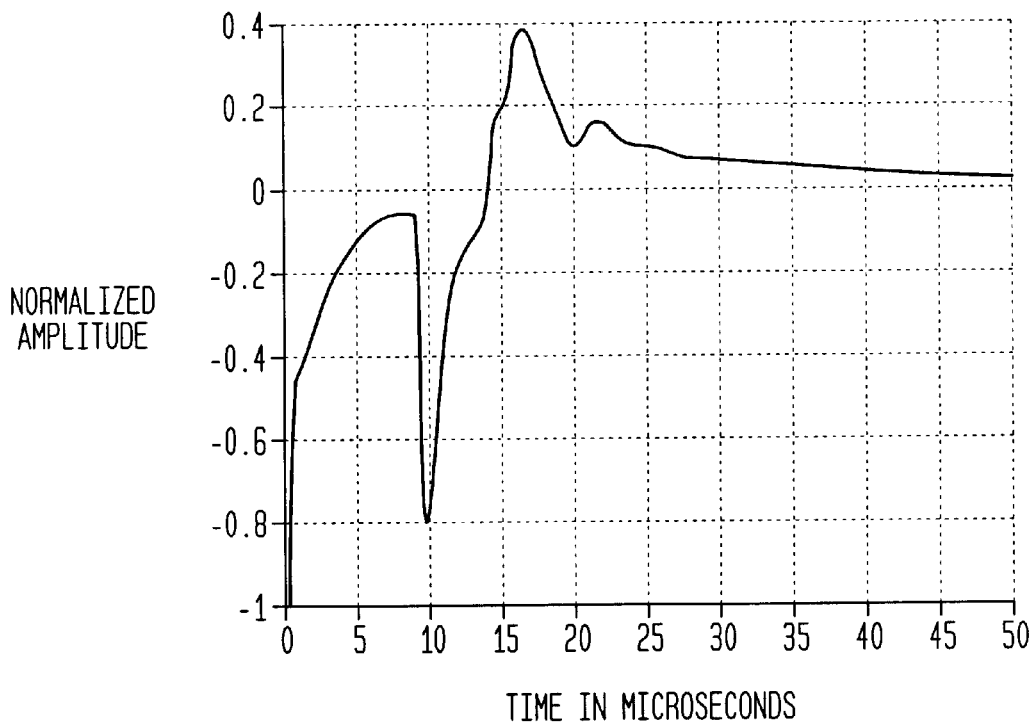
FIG. 9A illustrates a simulation of the effects of filtering the echo signals with an inverse filter in accordance with our invention for the loop of FIG. 8A (the inverse filter includes the transfer function of the section of the loop from the CO 13 to gauge change 805)
Figure 9B:
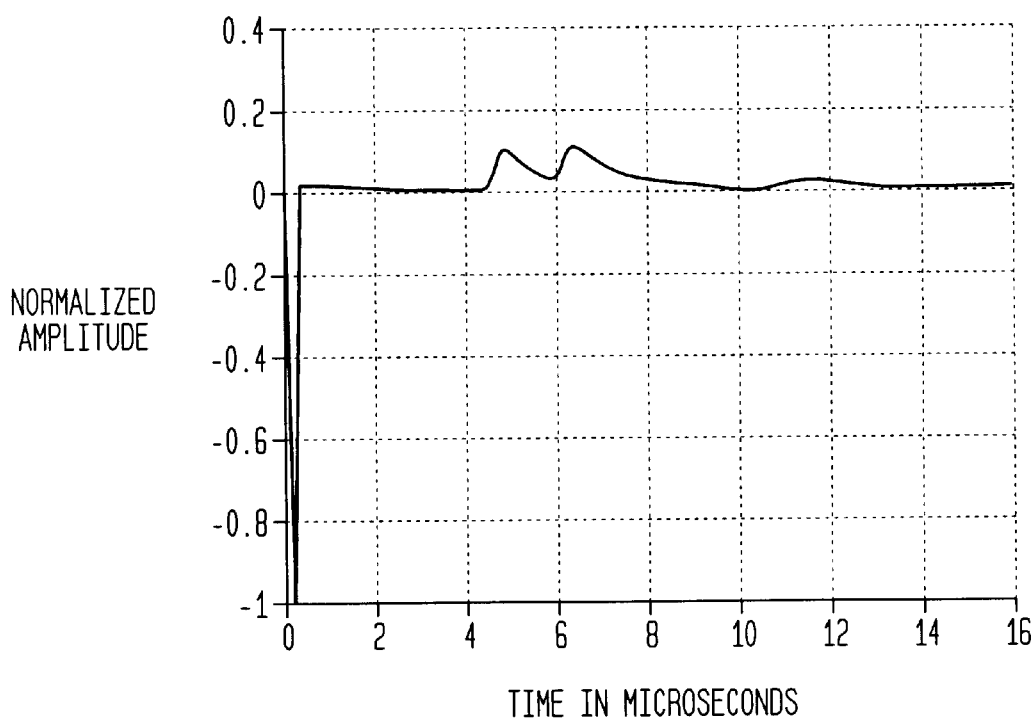
FIG. 9B illustrates a simulation of the effects of filtering the echo signals with an inverse filter in accordance with our invention for the loop of FIG. 8A (the inverse filter includes the transfer function ode sections of the loop from the CO 13 to bridged tap 807)

An example of the results achievable with this technique is shown in FIGS. 8 and 9. Let us consider the well behaved loop shown in FIG. 8A; the real and spurious echoes are shown in FIG. 8B (separately) and in FIG. 8C (the superposition of real and spurious echoes). The first three echoes pertain to the gauge change 805 and the bridged tap 807. The first two echoes are negative, so that we can affirm that the first discontinuity is gauge change 805. The second and third echo show a negative/positive sequence, so that we can say that after the gauge change there is bridged tap 807. However, the last small positive peak is due to spurious echoes and not to the echo generated at the end of the loop (see FIGS. 8B and 8C), because the echo generated at the end of the loop is hidden by the positive echo of the bridged tap. In fact, the echo paths of these last two echoes differ by 1000 feet only and this corresponds to a time delay of 1.5 µs, a time delay that is too small with respect to the time duration of the positive echo pertaining to the bridged tap. From the previous considerations, we can easily detect the first two discontinuities, so that we can build the inverse transfer function pertaining to the first two loop sections. FIGS. 9A and 9B show the effect of inverse filtering on the identification process. The normalized observed realization filtered with the inverse transfer function of the first loop section, i.e. the loop section from the CO up to the gauge change, is shown in FIG. 9A. The first two negative echoes are more separated, but we still cannot detect the echo pertaining to the end of the loop. In fact, we "moved" our reference point only 1000 feet forward. However, if we filter the observation data with the inverse transfer function of the first two loop section, i.e. the loop section from the CO up to the junction of the bridged tap, we are finally able to detect the last echo due to the end of the loop. In fact, as FIG. 9B shows, we have two peaks approximately 1.5 µs apart, and this time difference corresponds to the 1000 feet difference between the echo path of the positive echo of the bridged tap and of the end of loop. Around 11.5 µs, we can also appreciate the spurious echoes.

Figure 10A:
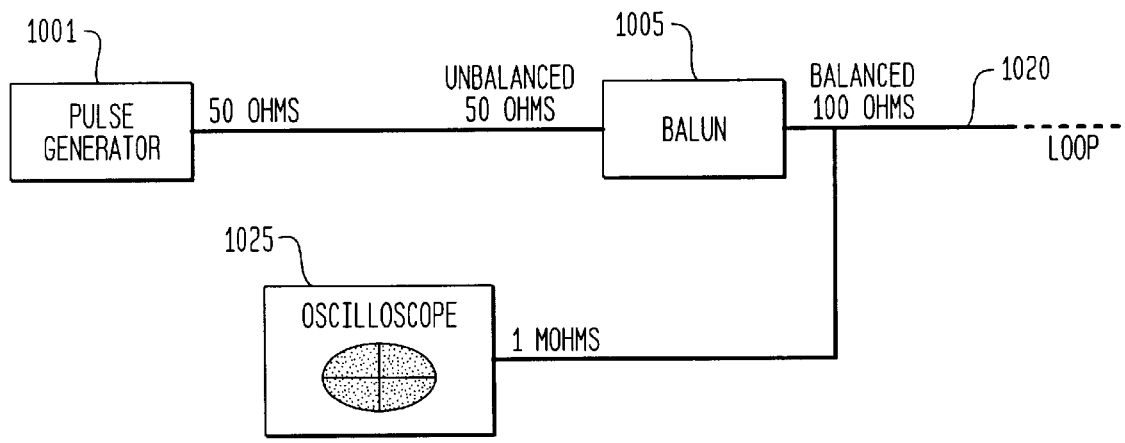
FIG. 10A illustrates an experimental setup used to verify our inventive method.
Figure 10B:
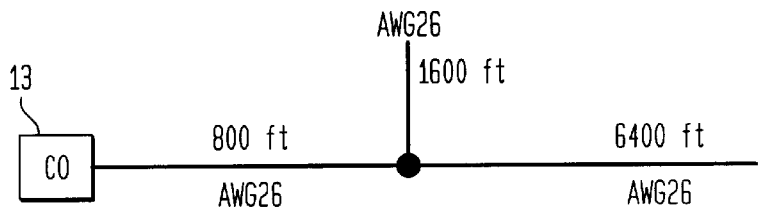
FIG. 10B illustrates the loop used in the setup of FIG. 10A.
Figure 10C:
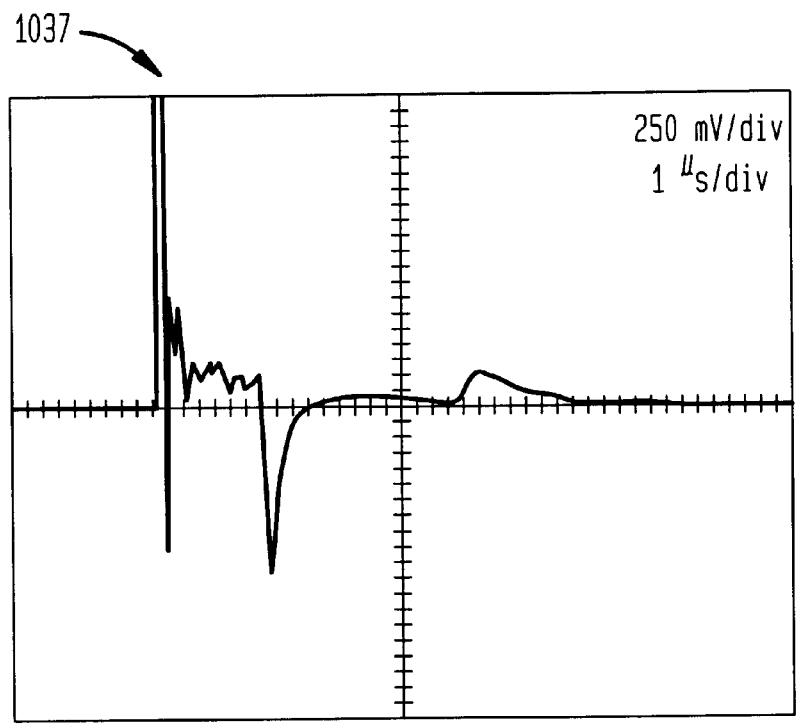
FIG. 10C depicts the echoes generated by the loop of FIG. 10B on the scope of FIG. 10A.
Figure 10D:
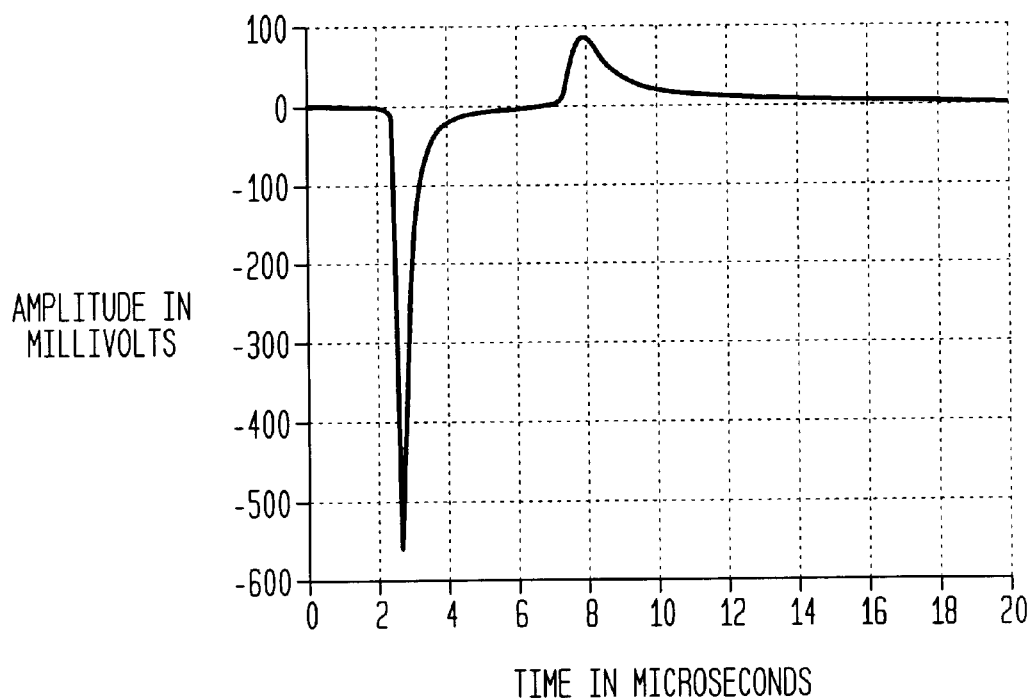
FIG. 10D depicts our simulation of the echoes generated by the loop of FIG. 10B.

FIGS. 8B, 8C, 9A, and 9B demonstrate the feasibility of using our method to determine loop make-up. Though thee figures are simulations, we have verified, within the limits of commercially available equipment, our method via actual measurement, as illustrated in FIGS. 10A, 10B, 10C, and 10D. Our measurement set up is illustrated in FIG. 10A and consists of a pulse generator 1001 that is coupled through a balun 1005 to a loop under test 1020. The output of the pulse generator was a square wave of 5 volts (on 50 ohms) with a width of 2 ns and a 5 ns rise and fall time. The balun 1005 provides a 50 ohms unbalanced to a 100 ohms balanced conversion. An oscilloscope 1025 i used to receive echoes generated on the loop under test 1020. In FIG. 10B, the loop under test is illustrated. It is understood that the equipment, namely generator 1001, balun 1005, and oscilloscope 1025, illustrated in FIG. 10A, is located in CO 13. Turning now to FIG. 10C, there is depicted an oscilloscope trace of the echoes generated by the loop of FIG. 10B. In FIG. 10D the loop is simulated in accordance with out method. As FIG. 10D shows, the simulation and trace match up almost perfectly. The trace 1037 of FIG. 10C is obtained by the circuitry of FIG. 10A including the balun 1005.

We have done other measurements and simulations to verify our measurement method and have concluded that our method can be used to determine the make-up of a loop. Our measurements, however, also demonstrated that under certain conditions gauge changes cannot be detected using the simple set up of FIG. 10A. For distances on the order of 5,000 ft (5 kft) the amplitude of the reflected echo is on the order of micro-volts. Assuming that the white noise has power density spectrum of –120 dBw/Hz over 100 ohms, for a bandwidth of 5 MHz the noise would be in the mircovolt range as well. Nonetheless, these shortcomings may be overcome by using high density pulses and repetitive probing followed by noise averaging.

It is worth pointing out that the use of our method allows us to simplify the model of the echoes given in eqs. (1) and (2). In fact, since our method compensates for the distortion of the medium, the arriving echoes will be much more "similar" to the probing signal transmitted in the loop, as if we were transmitting on a non-dispersive channel. Using the inverse of the transfer function of the first $n^{th}$ loop sections to detect the echo generated in the $(n+1)^{th}$ loop section does not eliminate all the distortion; however, we may model the residual distortion as a simple attenuation. This allows us the following simplification of the model (see eq.(2)):

$$e^{(i)}(t)=s(t)*h_{ep}^{(i)}(t) \approx s(t)*(a_i \delta(t))=a_i s(t) \quad (8)$$

On the basis of (8), the model given by eq. (1) can be rewritten as:

$$r(t) = \sum_i a_i s(t - \xi_i) \quad (9)$$

This simplification allows us to state the problem of time of arrival and amplitude estimation in a simple way.

Another improvement that may be useful in combating the overlapping of consecutive echoes would be to subtract a "synthesized" echo from the observation data as indicated by block 735 of FIG. 7A. Specifically, and with reference to FIG. 7A, once a discontinuity has been identified (step 730), the echo caused by that discontinuity could be generated via software and subtracted during processing, step 735. This "onion peeling" technique will ensure that the later arriving echoes will not be hidden by previously arriving echoes. In addition our "onion peeling" approach may also be used to remove the effect of spurious echoes. It should be noted that step 735 would be done in parallel with identifying the loop makeup, step 730. That is, as the method moves out onto the loop identifying each discontinuity via the observation data, each discontinuity and spurious echo will be removed from the observation in data before identifying the next discontinuity. It should be noted that "onion peeling" is optional and our underlying method would work well for a large majority of loops currently deployed in the Public Switched Telephone Network.

On the basis of the above considerations, we can now summarize the main steps of the identification algorithm.

1. Compute the arrival times of the $i^{th}$ and $(i+1)^{th}$ echoes and determine the correspondent distances from the CO (this step is representing by block 7302 of FIG.7 C);
2. Determine the sign sequence of the $i^{th}$ and $(i+1)^{th}$ echoes according to the following (block 7302 of FIG. 7C):
   Negative-Negative: the $i^{th}$ discontinuity is a gauge change, from a thinner to a thicker cable;
   Negative-Positive: the $i^{th}$ discontinuity is a bridged tap or the $i^{th}$ and $(i+1)^{th}$ discontinuities are two consecutive gauge changes from thinner to thicker to thinner cable;
   Positive-Positive: the $i^{th}$ discontinuity is a gauge change from thicker to thinner cables; or
   Positive-Negative: the $i^{th}$ discontinuity is a gauge change from a thicker to a thinner cable.
   Note that if the loop is well behaved then the only possible transitions are:
   Negative-Negative: $i^{th}$ discontinuity is a gauge change from thinner to thicker; or
   Negative-Positive: the $i^{th}$ discontinuity is a bridged tap.
3. Compute the absolute value of the peak of the $i^{th}$ echo and compare it to simulation results in order to determine the kind of gauge constituting the $i^{th}$ loop section, step 7303 (if a bridged tap was detected, proceed in the same way to identify the $(i+1)^{th}$ loop section also);
4. Compute the transfer function of all the loop sections up to the $i^{th}$ discontinuity (step 7305) (if a bridged tap was detected, do not include the bridged tap in the transfer function because the echo generated by the discontinuity following the bridged tap does not "travel" on it and, thus, is not distorted by it);
5. Synthesize the inverse filter (step 7309);
6. Operate the convolution between the inverse filter and the observation data (step 7313);
7. Compute the next echo arrival time (i.e., compute the $(i+2)^{th}$ echo arrival time), however, if a bridged tap was previously detected, compute the next two echoes arrival time (i.e., compute the (i+2) and (i+3) echo arrival times); and
8. Set i=i+1 if a bridged tap was not detected or set i=i+2 if a bridged tap was detected and repeat items 1 through 7 from the list above until the last discontinuity is determined.

Figure 7C:
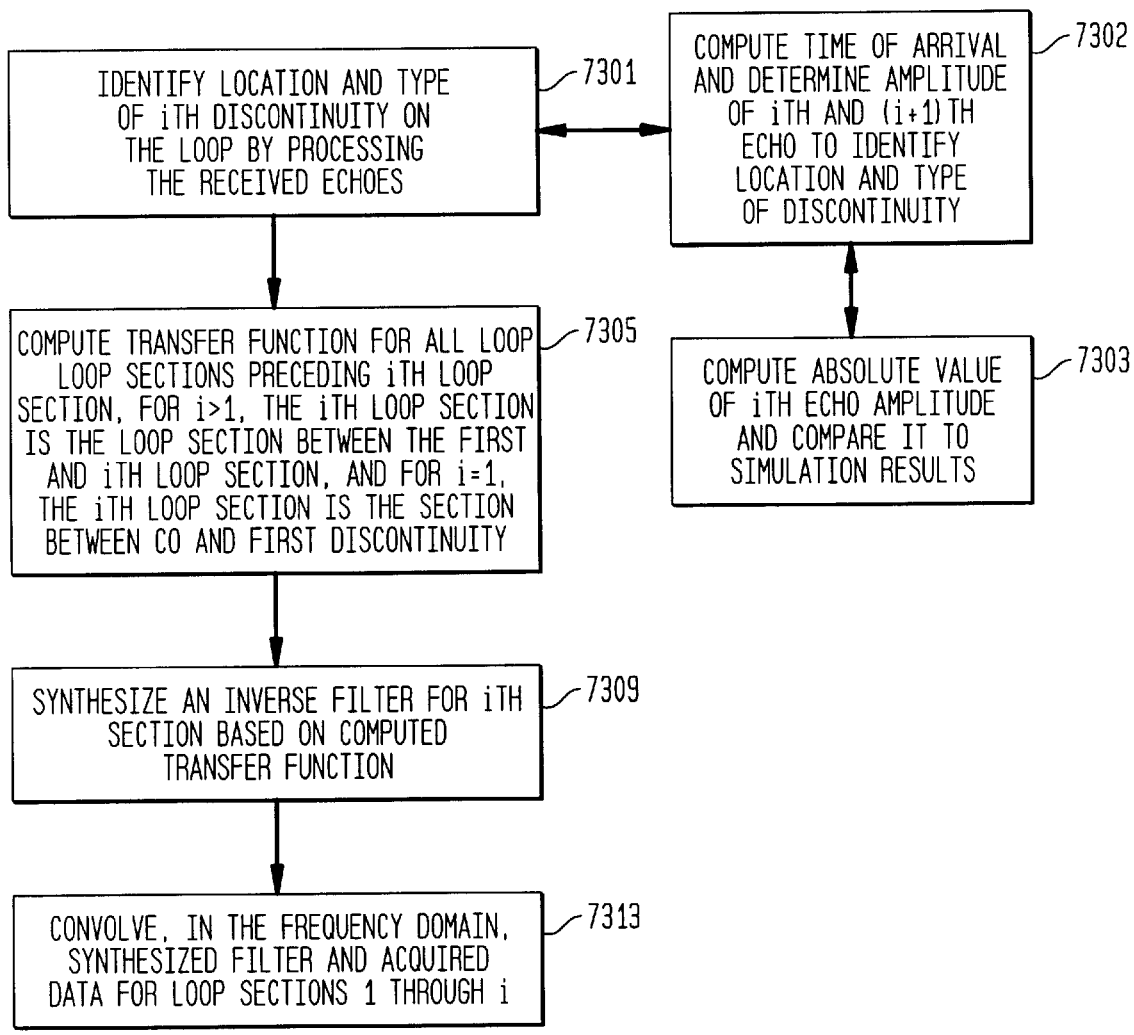
FIG. 7C illustrates the substeps of step 730 of FIG. 7A.

Note from the list above and FIG. 7C discontinuities are determined by processing the echoes in pairs. Note also that bridged taps are afforded special attention because the echo generated by a bridged tap does not travel on the loop section comprising the bridged tap. The above seven steps illustrate the main steps followed during Phase 3 of our method. However, these steps may not be sufficient to achieve unambiguous loop make-up identification if the four assumptions pointed out earlier are not satisfied. Below we describe an approach that can be used to resolve ambiguities.

3.4 Phase 4 (Step 740): Resolution Of Ambiguities

This method step is the most sophisticated and delicate part of the identification process. The problem of resolving an unknown number of closely spaced, overlapping and noisy echoes of a signal with a priori known shape is a problem that arises in many applications such as radar and sonar processing, geological sounding, etc. In principle, this is a combined detection-estimation problem since we have to determine first the number of returning echoes and, then, apply an estimation procedure to determine their location in time. The usual approach is to assume the availability of an array of M sensors located in the far field of the sources, so that the waves generated by each of the D radiating sources behave like plane waves.

The signal received by the M sensors is usually modeled as follows:

$$\begin{bmatrix} r_1(t) \\ \vdots \\ r_M(t) \end{bmatrix} = [A(\vartheta_1) \cdots A(\vartheta_D)] \begin{bmatrix} s_1(t) \\ \vdots \\ s_D(t) \end{bmatrix} + \begin{bmatrix} n_1(t) \\ \vdots \\ n_M(t) \end{bmatrix} \quad (10)$$

or, more compactly, as:

$$r = As + n \quad (1)$$

where $r_i(t)$ is the signal received at the i-th sensor (i=1, ..., M), $s_j(t)$ is the signal generated by the j-th sensor (j=1, ..., D), $A(\Theta)$ is the "signature" of a source in the direction 73 and $n_i(t)$ is an independent noise affecting the i-th sensor. The set of signature vectors $A(\Theta)$ is also called the array manifold, since it characterizes the directional properties of the sensor array. The array manifold may be obtainable in a closed form for simple spatial geometries (e.g., linear, circular), or can be measured through field calibration procedures. By carefully choosing the array geometry, it is possible to ensure the following property: for any set of parameters $\Theta$ with D<M elements, the array manifold vectors are linearly independent.

There have been several approaches to such problems. First of all we can recall Capon's Maximum Likelihood method and Burg's Maximum Entropy method. These methods have been widely used in the past but their main limitation is due to the fact that they use an incorrect model of the measurements: an autoregressive model instead of an autoregressive-moving-average model. The first one to exploit the structure of the data model using a covariance approach was Pisarenko, even though he considered a very particular case: parameter estimation of cissoids in additive noise. The covariance approach to the case of sensor arrays of arbitrary form was first developed by Schmidt and Bienvenu and Kopp. Their algori[th] m, widely known as Multiple Signal Classification (MUSIC) algorithm, was the first algorithm to exploit the eigenstructure of the covariance matrix of the observed data. The basic principle of this sub-space approach lies in the fact that, when there are more measurements than signals (D<M), the signal component of the received data (As) is confined to at most a D-dimensional subspace (the signal subspace) of the M-dimendional space of the observations. Since the noise is typically assumed to possess energy in all the dimensions of the observation space, the problem is to extract a low-rank signal observed in a full-rank noise. There are two other more recent subspace methods that are worth mentioning because they are able to provide performances superior to MUSIC: the Estimation of Signal Parameters via Rotational Invariance (ESPRIT) algorithm and the Weighted Subspace Fitting (WSF) algorithm.

It would certainly be useful to exploit this vast literature for the resolution of the overlapping echoes in the problem of loop make-up identification via single ended measurements. The main difference between our case and the model in eqs. (10)–(11) is that we do not have the availability of a sensor array. However, it is possible to reformulate our observation model in order to provide it with a structure identical to the model in eqs. (10)–(11) Our observation model is:

$$r(t) = \sum_i a_i s(t - \xi_i) + n(t) \quad (12)$$

Assuming that there are D main echoes and sampling the received waveform r(t) at M instants, we can write:

$$r(t_1) = \sum_{i=1}^{D} a_i s(t_1 - \xi_i) + n(t_1) \quad (13)$$

$$r(t_2) = \sum_{i=1}^{D} a_i s(t_2 - \xi_i) + n(t_2)$$

$$\vdots$$

$$r(t_M) = \sum_{i=1}^{D} a_i s(t_M - \xi_i) + n(t_M)$$

and, using a matrix notation, we obtain:

$$\begin{bmatrix} r(t_1) \\ r(t_2) \\ \vdots \\ r(t_M) \end{bmatrix} = \begin{bmatrix} s(t_1 - \xi_1) & s(t_1 - \xi_2) & \cdots & s(t_1 - \xi_D) \\ s(t_2 - \xi_1) & s(t_2 - \xi_2) & \cdots & s(t_1 - \xi_D) \\ \vdots & \vdots & \vdots & \vdots \\ s(t_M - \xi_1) & s(t_M - \xi_2) & \cdots & s(t_M - \xi_D) \end{bmatrix} \begin{bmatrix} a_1 \\ a_2 \\ \vdots \\ a_D \end{bmatrix} + \begin{bmatrix} n(t_1) \\ n(t_2) \\ \vdots \\ n(t_M) \end{bmatrix} \quad (14)$$

or, equivalently, $$r = Sa + n \quad (15)$$

The model in eq. (15) has the same structure as the model in eq. (11), with the only difference that now the array manifold for the signal resolution problem is obtained from the signal shape. Furthermore, the desired array manifold (linear independence of the rows of S for any set of D<M delays) is satisfied provided that we work with finite-span pulse type waveforms.

On the basis of the new model structure in eq. (15), we are now able to exploit the MUSIC, the ESPRIT and the WSF algorithms previously mentioned to detect the number of echoes and estimate their arrival time.

The array manifold S in eq. (15) requires the knowledge of the shape of the echo and that all the echoes have the same shape. This is impossible to obtain in our case but it is possible to define a "reasonable" shape of the echo. In fact, as previously pointed out above, the shape of all the echoes is similar and they differ only by their width which is a function of their distance from the CO. Moreover, we can make the CO "nearer" to far discontinuities by filtering the data with an appropriate filter. This would ensure that the use of an array manifold containing echoes of the same shape is a less problematic approximation. A possible choice for a "reasonable" shape of the echo could be:

$$e(t)=F^{-1}\{\exp(-\alpha\sqrt{f})\} \quad (16)$$

where α is a parameter that has to be optimized. The choice of an exponential function is due to the fact that it is a good approximation for the transfer function of the twisted pair channel. The choice of a signal of the kind of (16) has another advantage. It preserves the linear independence of the array manifold, whereas the piecewise probing signal would not.

When defining a value for the number of samples M, we have to make sure that we have D<M. Fortunately, the real echoes generated by a loop are limited to a maximum of ten to fifteen, but the spurious echoes are virtually infinite. In this sense, the value for M should be chosen very high and this could compromise the computational efficiency of the algorithm.

With respect to the arrival estimation problem, the use of a sensor array and the linear independence of the array ensure that the subspace algorithms can detect the emitting sources and separate them from spurious reflections due, for example, to multipath phenomena. In fact, a linear combination of two or more direction signatures will never provide the "phantom" signature of some different direction. However, this property is not maintained in the single-sensor case. In fact, the spurious echoes generated in a loop will be considered as real echoes and the algorithm will not be able to isolate them.

The above description has been presented only to illustrate and describe the invention. It is not intended to be exhaustive or to limit the invention to any precise form disclosed. Many modifications and variations are possible in light of the above teaching. The applications described were chosen and described in order to best explain the principles of the invention and its practical application to enable others skilled in the art to best utilize the invention on various applications and with various modifications as are suited to the particular use contemplated.

We claim:

1. A method for determining the make-up of a subscriber loop in a communications system, said make-up including the presence or absence and location of one or more of gauge changes and bridged taps, the length of the loop including the length of each bridged tap, and the gauge of each loop section, said method comprising the steps of:
   repetitively applying signals to the subscriber loop to obtain echoes from the subscriber loop;
   receiving the echoes based on said transmitted signals, said echoes being caused by discontinuities on the subscriber loop; and
   using a mathematical model contained in a processor, determining the make-up of the loop based on the received echoes from said repetitively applied signals by using a function in the time domain based on said mathematical model separately for each loop section that causes an echo.

2. The method in accordance with claim 1 wherein said step of determining comprises the substeps of:
   identifying the location and type of the $i^{th}$ discontinuity on the loop for each section of the loop based on the arrival times and amplitudes of the received echoes;
   computing a transfer function of all loop sections that precede the $i^{th}$ discontinuity excluding bridged taps;
   synthesizing an inverse filter for said transfer function;
   convolving said synthesized filter and said received echoes; and
   passing to the identification of the next discontinuity by posing i=i+1 if the $i^{th}$ discontinuity is not a bridged tap and posing i=i+2 otherwise.

3. The method in accordance with claim 2 wherein said step of identifying comprises the substeps of:
   estimating the arrival times of the $i^{th}$ and the $(i+1)^{th}$ echoes;
   determining the distance of said discontinuities based on said estimation; and
   detecting the sign sequence of the $i^{th}$ and $(i+1)^{th}$ echoes and if said sign sequence is
      negative-negative, then record the $i^{th}$ discontinuity as a gauge change from a thinner to a thicker cable; or
      negative-positive, then record the $i^{th}$ discontinuity as a bridged tap or record the $i^{th}$ and $(i+1)^{th}$ discontinuities as two consecutive gauge changes from thinner to thicker to thinner cable; or
      positive-positive, then record the $i^{th}$ discontinuity as a gauge change from thicker to thinner cables, or
      positive-negative, then record the $i^{th}$ discontinuity as a gauge change form a thicker to a thinner cable.

4. The method in accordance with claim 2 wherein said step of identifying comprises the substeps of:
   estimating the absolute amplitude value of the $i^{th}$ echo pulse;
   simulating said echo pulse based on said mathematical model in the processor; and
   comparing said estimate to said simulation to determine the gauge of the $i^{th}$ loop section.

5. The method in accordance with claim 2 further comprising simulating in said mathematical model the echo of the $i^{th}$ discontinuity and subtracting said simulated echo from said received echoes.

6. The method in accordance with claim 2 further comprising simulating in said mathematical model spurious echoes and subtracting the simulated spurious echoes from said received echoes.

7. The method in accordance with claim 2 further comprising updating the loop record to correspond to said determined loop make-up.

8. A system for determining the make-up of a subscriber loop, said make-up including the presence or absence and location of one or more of gauge changes and bridged taps, the length of the loop including the length of each bridged tap, and the gauge of each loop section, said system comprising:
   a broadband test head device for repetitively applying signals to the subscriber loop to obtain echoes from the subscriber loop;
   access circuitry connecting said broadband test head device to the subscriber loop; and
   a processor connected to said broadband test head device, said processor performing the steps of
   estimating the arrival time of two successive echoes received from the subscriber loop when a signal is applied to said loop through said access circuitry, and
   using a mathematical model determining the make-up of the loop based on the received echoes from the repetitively applied signals.

9. The system in accordance with claim 8 wherein said processor further determines the sign sequence of the two successive echoes as negative-negative, negative-positive, positive-positive, or positive-negative and estimates the absolute value of the peak of each echo.

10. The system in accordance with claim 8 wherein said processor also computes the transfer function of a section of said subscriber loop;
   synthesizes an inverse filter; and
   operates the convolution between said inverse filter and said received echoes.

11. The system in accordance with claim 8 wherein said broad band test head device comprises a signal generator and an echo receiver.

12. A system form determining the make-up of a subscriber loop, said make-up including the presence or absence and location of one or more of gauge changes and bridged taps, the length of the loop including the length of each bridged tap, and the gauge of each loop section, said system comprising:

a transmitter for repetitively applying broadband signals to the subscriber loop;

a receiver for receiving echoes from sections of the subscriber loop, said echoes being caused by discontinuities on the subscriber loop; and a processor containing a mathematical model for determining the make-up of the subscriber loop based on the received echoes from the repetitively applied signals, said processor computing functions for sections the discontinuities of the loop sequentially.

13. The system in accordance with claim 12 wherein said processor simulates spurious echoes and subtracts said simulated spurious echoes from echoes received from the subscriber line.

14. The system in accordance with claim 12 wherein said processor simulates real echoes and subtracts said simulated real echoes from echoes received from the subscriber line.

* * * * *

UNITED STATES PATENT AND TRADEMARK OFFICE
CERTIFICATE OF CORRECTION

PATENT NO. : 6,538,451 B1  Page 1 of 1
DATED : March 25, 2003
INVENTOR(S) : Stefano Galli et al.

It is certified that error appears in the above-identified patent and that said Letters Patent is hereby corrected as shown below:

<u>Title page,</u>
Item [57], ABSTRACT,
Line 1, change "having" to -- comprising --.

<u>Column 21,</u>
Line 4, change "form" to -- for --.

<u>Column 22,</u>
Line 4, after "functions for" delete "sections".

Signed and Sealed this

Thirteenth Day of December, 2005

JON W. DUDAS
*Director of the United States Patent and Trademark Office*